(12) United States Patent
Schobeiri et al.

(10) Patent No.: US 11,966,951 B2
(45) Date of Patent: *Apr. 23, 2024

(54) SYSTEMS, METHODS, AND DEVICES FOR DIGITAL ADVERTISING ECOSYSTEMS IMPLEMENTING CONTENT DELIVERY NETWORKS UTILIZING EDGE COMPUTING

(71) Applicant: MediaMath Acquisition Corporation, New York, NY, New York, NY (US)

(72) Inventors: Wilfried A. Schobeiri, Chicago, IL (US); David Laverty, Norwalk, CT (US)

(73) Assignee: MediaMath Acquisition Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/051,779

(22) Filed: Nov. 1, 2022

(65) Prior Publication Data
US 2023/0162238 A1    May 25, 2023

Related U.S. Application Data

(63) Continuation of application No. 17/450,119, filed on Oct. 6, 2021, now Pat. No. 11,514,477, which is a
(Continued)

(51) Int. Cl.
  *G06Q 30/0251*    (2023.01)
  *G06F 21/62*       (2013.01)
(Continued)

(52) U.S. Cl.
  CPC ..... *G06Q 30/0269* (2013.01); *G06F 21/6263* (2013.01); *G06Q 30/0204* (2013.01);
  (Continued)

(58) Field of Classification Search
  None
  See application file for complete search history.

(56) References Cited

U.S. PATENT DOCUMENTS

| | | | |
|---|---|---|---|
| 2014/0059343 A1* | 2/2014 | Mohajeri | H04W 12/06 455/411 |
| 2014/0201007 A1* | 7/2014 | Stack | G06Q 10/10 705/14.66 |

(Continued)

OTHER PUBLICATIONS

Hornyack et al. ("These aren't the droids you're looking for: retrofitting android to protect data from imperious applications," in Proceedings of the 18th ACM conference on Computer and communications security (CCS '11), Association for Computing Machinery, New York, NY, USA, 639-652. Year: 2011) (Year: 2011).*

*Primary Examiner* — Christopher B Tokarczyk
(74) *Attorney, Agent, or Firm* — Jones Day

(57) ABSTRACT

Disclosed herein are systems and techniques for using a content delivery network to perform various functions within a digital advertising ecosystem, in ways that yield technological benefits such as improved security, efficiency, and speed (for example, reduction in publisher load times). As one specific example, a content delivery network can be used for the creation of electronic tokens for user identity protection between demand side platforms, supply side platforms, content creators (for example, advertisers), and publishers.

20 Claims, 13 Drawing Sheets

Related U.S. Application Data continuation of application No. 17/028,659, filed on Sep. 22, 2020, now Pat. No. 11,182,829.

(60) Provisional application No. 62/904,471, filed on Sep. 23, 2019.

(51) Int. Cl.
| | |
|---|---|
| *G06Q 30/0204* | (2023.01) |
| *G06Q 30/0273* | (2023.01) |
| *H04L 67/146* | (2022.01) |
| *H04L 67/306* | (2022.01) |
| *H04L 67/56* | (2022.01) |
| *H04L 9/32* | (2006.01) |
| *H04L 67/1097* | (2022.01) |
| *H04L 101/37* | (2022.01) |

(52) U.S. Cl.
CPC ....... *G06Q 30/0275* (2013.01); *H04L 67/146* (2013.01); *H04L 67/306* (2013.01); *H04L 67/56* (2022.05); *G06Q 2220/00* (2013.01); *H04L 9/3213* (2013.01); *H04L 67/1097* (2013.01); *H04L 2101/37* (2022.05)

(56) References Cited

U.S. PATENT DOCUMENTS

| | | | |
|---|---|---|---|
| 2015/0051986 A1* | 2/2015 | Saifee | G06Q 30/0261 705/14.71 |
| 2019/0373077 A1* | 12/2019 | Lepore | H04L 63/12 |
| 2020/0160388 A1* | 5/2020 | Sabeg | G06Q 30/0269 |

* cited by examiner

SYSTEMS, METHODS, AND DEVICES FOR DIGITAL ADVERTISING ECOSYSTEMS IMPLEMENTING CONTENT DELIVERY NETWORKS UTILIZING EDGE COMPUTING

CROSS-REFERENCE TO RELATED APPLICATIONS

This application, is a continuation of U.S. patent application Ser. No. 17/450,119, filed Oct. 6, 2021, and titled "SYSTEMS, METHODS, AND DEVICES FOR DIGITAL ADVERTISING ECOSYSTEMS IMPLEMENTING CONTENT DELIVERY NETWORKS UTILIZING EDGE COMPUTING," which is a continuation of U.S. patent application Ser. No. 17/028,659, filed Sep. 22, 2020, and titled "SYSTEMS, METHODS, AND DEVICES FOR DIGITAL ADVERTISING ECOSYSTEMS IMPLEMENTING CONTENT DELIVERY NETWORKS UTILIZING EDGE COMPUTING," which claims the benefit of U.S. Provisional Patent Application No. 62/904,471, filed Sep. 23, 2019, and titled "SYSTEMS, METHODS, AND DEVICES FOR DIGITAL ADVERTISING ECOSYSTEMS IMPLEMENTING CONTENT DELIVERY NETWORKS UTILIZING EDGE COMPUTING," which are hereby incorporated by reference in their entireties.

TECHNICAL FIELD

The present disclosure relates to systems and methods for using a content delivery network to perform various functions within a digital advertising ecosystem, in ways that yield technological benefits such as improved security, efficiency, and speed (for example, reduction in publisher load times). As one example, in some embodiments described herein, a content delivery network can be used for the creation of electronic tokens for user identity protection between demand side platforms, supply side platforms, content creators (for example, advertisers), and publishers.

BACKGROUND

Online publishers typically provide or allocate portions of their web pages for advertising purposes. These areas are sometimes referred to as impression opportunities. Some of the impression opportunities are available for advertising products, services, or businesses not directly provided by or related to the online publishers, and these impression opportunities can be sold to advertisers for a price within the digital advertising ecosystem—either directly to advertisers, through advertising networks, or through advertising exchanges (for example, ad exchanges).

Ad exchanges serve as online marketplaces where publishers, advertisers, agencies, and ad networks (for example, demand-side platforms and supply-side platforms) can buy and sell their ad inventory. Ad exchanges provide a platform for buying and selling advertising impressions by consolidating and managing impression opportunities across a plurality of publishers, and ad exchanges can use real-time bidding to allow advertising impression opportunities to be sold on an impression-by-impression basis. This enables advertisers to create very highly targeted campaigns to pick and choose from available impression opportunities, which are auctioned off to the highest bidder. In other words, ad exchanges allow advertisers to bid against each other to display their advertisement to individual consumers that are most likely to be interested in it. The real-time bidding for selecting the advertisement to display to a user accessing the publisher's content and the delivery of the advertisement to the user can all occur within a fraction of a second.

However, opportunities may exist to improve the functioning of digital advertising ecosystems through the use of content delivery networks, which are typically a system of distributed servers (for example, a network) that deliver pages and other web content to a user device, based on the geographic locations of the user, the origin of the content and the content delivery server. Such implementations of content delivery networks within the digital advertising ecosystem and their associated technological benefits are contemplated herein.

SUMMARY

Disclosed herein are systems and techniques for implementing a content delivery network to perform various functions within a digital advertising ecosystem, in ways that yield technological benefits such as improved security, efficiency, and speed (for example, reduction in publisher load times).

For example, in a configuration of content delivery networks may be capable of edge computing, allowing them to perform functions beyond the simple delivery of web content. Depending on the implementation of the content delivery network, the content delivery network can be used in to host, synchronize, or delimit data among the entities of the digital advertising ecosystem, it can perform certain functions on behalf of the entities in the digital advertising ecosystem, and/or it can even replace certain entities entirely.

As an example, a content delivery network can be used for the creation of electronic tokens for user identity protection between demand side platforms, supply side platforms, content creators (for example, advertisers), and/or publishers. This can prevent certain entities (for example, demand side platforms) from being able to determine the unique user identity associated with a particular impression opportunity that is being offered through the digital advertising ecosystem.

Various embodiments of the present disclosure provide improvements to various technologies and technological fields. For example, as will be described herein, existing processes for real-time bidding on impression opportunities within the digital advertising ecosystem can be limited in various ways (some examples include: personally-identifying user data is growing in difficulty to match to pseudonymous data as third-party cookies continue to deprecate and third-party cookies will eventually no longer support the re-identification and targeting of user data, maximizing publisher revenue may require technical implementations that are burdensome on user devices, and so forth). The various embodiments of the disclosure provide significant improvements over such technology. Additionally, various embodiments of the present disclosure are inextricably tied to computer technology. In particular, various embodiments rely on content delivery networks, particularly content delivery networks capable of performing edge computing (for example, a distributed computing paradigm which brings computation and data storage closer to the location where it is needed, to reduce latency, improve response times and save bandwidth). Such features and others (for example, the distributed processing and analysis of large amounts of electronic data at the edge of the Internet) are intimately tied to, and enabled by, computer technology, and would not exist except for computer technology. For example, the real-time bidding described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Furthermore, various embodiments of the present disclosure prevent user-based data leakage. Examples of such user-based data leakage include cookie-mapping, or the scenario of the DSP receiving a hashed email (e.g., instead of a token), storing the hashed email, and re-uploading the hashed email to an identity service provider for re-identification. For example, if a publisher included a hashed email in their bid requests, the DSP (or any entity in the receiving chain of bidding events) could then generate a hashed email audience of users accessing the publisher's resource. There is no cookie-mapping happening at all, but still a major risk of data leakage.

In various embodiments, a computing system is contemplated for a content delivery network, enabling identity escrow and/or preventing user-based data leakage (such as cookie-mapping). The computing system may include a computer readable storage medium having program instructions embodied therewith and one or more processors configured to execute the program instructions to cause the computer system to perform the processes of: initiating delivery of content to a computing system of a user in response to a request for the content by the computing system of the user; storing a first deterministic identifier associated with the user, wherein the first deterministic identifier comprises a first lexical token associated with at least one type of identifying data for the user; storing user-specific preference information associated with the user based on the first deterministic identifier associated with the user; receiving, from a publisher, a second deterministic identifier, wherein the second deterministic identifier comprises a second lexical token, wherein the publisher does not have access to the first deterministic identifier or the at least one type of identifying data for the user or the user-specific preference information; determining if the second deterministic identifier is associated with the user associated with the first deterministic identifier; retrieving the stored user-specific preference information associated with the user based on a determination that the second deterministic identifier and the first deterministic identifier are both associated with the user; generating an encrypted token for identity escrow based on the retrieved user-specific preference information associated with the user, wherein the generated encrypted token does not comprise any personally identifiable information for the user; transmitting the encrypted token to the publisher for submission alongside a bid request to a demand-side platform for real-time bidding, thereby providing the retrieved user-specific preference information associated with the user to the demand-side platform without revealing personally identifiable information for the user to the demand-side platform, thereby preventing cookie-mapping (or any other user-based data leakage) on a browser of a user device; and delivering to the computing system of the user the content and an ad impression, wherein the ad impression won the real-time bidding without access to personally identifiable information for the user and without cookie-mapping.

In some embodiments, the real-time bidding is processed outside of a header of the browser of the user device. In some embodiments, the real-time bidding is processed within a header of the browser of the user device. In some embodiments, the computing system is a proxy server of the content delivery network. In some embodiments, the user-specific preference information comprises market segment membership information associated with the user. In some embodiments, the user-specific preference information comprises purchasing preferences associated with the user. In some embodiments, the first deterministic identifier is an email address for the user. In some embodiments, the second deterministic identifier received from the publisher is associated with an impression opportunity offered by the publisher. In some embodiments, the program instructions, when executed, further cause the system to perform the step of transmitting the encrypted token to a supply-side platform. In some embodiments, the program instructions, when executed, further cause the system to perform the steps of: receiving, from a demand-side platform, a request for the user-specific preference information associated with the user that is included in the encrypted token; and providing the demand-side platform the user-specific preference information associated with the user by decrypting the encrypted token. In some embodiments, the program instructions, when executed, further cause the system to perform the steps of: receiving, from a demand-side platform, a request for the user-specific preference information associated with the user that is included in the encrypted token; and providing the demand-side platform the stored user-specific preference information associated with the user. In some embodiments, the second deterministic identifier is associated with the user and identical to the first deterministic identifier.

In various embodiments, a computer-implemented method for enabling identity escrow and preventing user-based data leakage (such as cookie-mapping) is contemplated. The method may include the steps of: initiating delivery of content to a computing system of a user in response to a request for the content by the computing system of the user; storing a first deterministic identifier associated with the user, wherein the first deterministic identifier comprises a first lexical token associated with at least one type of identifying data for the user; storing user-specific preference information associated with the user based on the first deterministic identifier associated with the user; receiving, from a publisher, a second deterministic identifier, wherein the second deterministic identifier comprises a second lexical token, wherein the publisher does not have access to the first deterministic identifier or the at least one type of identifying data for the user or the user-specific preference information; determining if the second deterministic identifier is associated with the user associated with the first deterministic identifier; retrieving the stored user-specific preference information associated with the user based on a determination that the second deterministic identifier and the first deterministic identifier are both associated with the user; generating an encrypted token based on the retrieved user-specific preference information associated with the user, wherein the generated encrypted token does not comprise any personally identifiable information for the user; transmitting the encrypted token to the publisher for submission alongside a bid request to a demand-side platform for real-time bidding, thereby providing the retrieved user-specific preference information associated with the user to the demand-side platform without revealing personally identifiable information for the user to the demand-side platform, thereby preventing cookie-mapping (or any other user-based data leakage) on a browser of a user device; and delivering to the computing system of the user the content and an ad impression, wherein the ad impression won the real-time bidding without access to personally identifiable information for the user and without cookie-mapping.

In some embodiments, the real-time bidding is processed outside of a header of the browser of the user device. In some embodiments, the user-specific preference information comprises market segment membership information associated with the user. In some embodiments, the user-specific preference information comprises purchasing preferences associated with the user. In some embodiments, the first deterministic identifier is an email address for the user.

In various embodiments, non-transitory computer readable storage media is contemplated. The non-transitory computer readable storage media stores instructions that, when executed by one or more processors, cause the one or more processors to enable identity escrow and prevent user-based data leakage (such as cookie-mapping) by performing the steps of: initiating delivery of content to a computing system of a user in response to a request for the content by the computing system of the user; storing a first deterministic identifier associated with the user, wherein the first deterministic identifier comprises a first lexical token associated with at least one type of identifying data for the user; storing user-specific preference information associated with the user based on the first deterministic identifier associated with the user; receiving, from a publisher, a second deterministic identifier, wherein the second deterministic identifier comprises a second lexical token, wherein the publisher does not have access to the first deterministic identifier or the at least one type of identifying data for the user or the user-specific preference information; determining if the second deterministic identifier is associated with the user associated with the first deterministic identifier; retrieving the stored user-specific preference information associated with the user based on a determination that the second deterministic identifier and the first deterministic identifier are both associated with the user; generating an encrypted token based on the retrieved user-specific preference information associated with the user, wherein the generated encrypted token does not comprise any personally identifiable information for the user; transmitting the encrypted token to the publisher for submission alongside a bid request to a demand-side platform for real-time bidding, thereby providing the retrieved user-specific preference information associated with the user to the demand-side platform without revealing personally identifiable information for the user to the demand-side platform, thereby preventing cookie-mapping (or any other user-based data leakage) on a browser of a user device; and delivering to the computing system of the user the content and an ad impression, wherein the ad impression won the real-time bidding without access to personally identifiable information for the user and without cookie-mapping.

In some embodiments, the real-time bidding is processed outside of a header of the browser of the user device. In some embodiments, the user-specific preference information comprises market segment membership information associated with the user.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

DETAILED DESCRIPTION

Overview

Figure 1A:
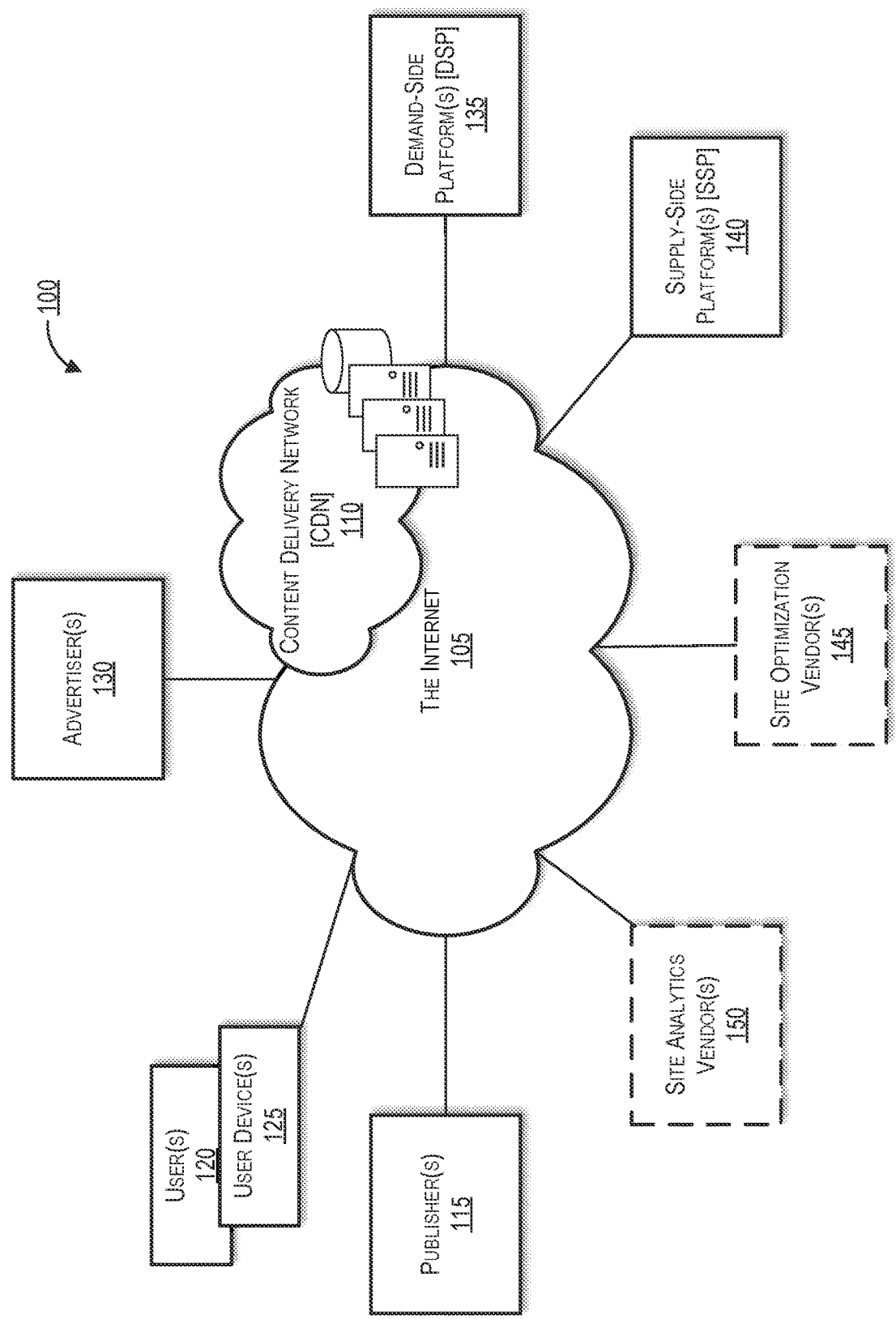
FIG. 1A is a block diagram illustrating an example system, according to some embodiments of the present disclosure.

A typical digital advertising ecosystem may include users, publishers (for example, content creators), advertisers, agencies, ad networks (for example, demand-side platforms and supply-side platforms), and ad exchanges. A user may access content of a publisher through a user device, and there may be available ad space to display an ad to the user. This is an impression opportunity, which the publisher may sell on an impression-by-impression basis to advertisers.

The publisher may send the impression opportunity to a supply-side platform, which can conduct an auction in an ad exchange with one or more demand-side platforms through a process called real-time bidding. Advertisers may create highly targeted campaigns to pick and choose from available impression opportunities and have demand-side platforms bid on their behalf in these real-time bidding. The demand-side platform may bid on an advertiser's behalf for an impression opportunity that meets the criteria for the advertiser's campaign. A link for an advertisement associated with the advertiser can be sent for the winning bid (for example, highest price) to the supply-side platform, which can forward the link to the publisher to retrieve the advertisement and display it with the content on the user device.

Thus, the real-time bidding for selecting the advertisement to display to a user accessing the publisher's content and the delivery of the advertisement to the user can all occur within a fraction of a second. However, not only is speed and efficiency of communications between the participants of the digital advertising ecosystem important, but security as well. So much user data is shared between the participants of the digital advertising ecosystem that care must be taken to prevent unauthorized participants from being able to determine a unique user identity and associating with it the behaviors of the user tracked over a length period of time.

Accordingly, opportunities may exist to improve the functioning of digital advertising ecosystems through the use of content delivery networks, which are typically a system of distributed servers (for example, a network) that deliver pages and other web content to a user device, based on the geographic locations of the user, the origin of the content and the content delivery server. These content delivery networks can be used to improve the speed, efficiency, and security of the data flows within the digital advertising ecosystem.

In some embodiments, there is disclosed a system for integrating a content delivery network within the digital advertising ecosystem that involves having the content delivery network serve as a singular entity for managing a user identity database to store collected user data (for example, first party data from advertisers) for different unique user identities. For example, when a publisher desires to auction off an impression opportunity that is associated with a user, the system can be used to provide details associated with the user to the content delivery network. In some embodiments, the content delivery network can retrieve, from the user identity database, any relevant information for that user identity. This may include personally-identifying information (for example, information about the user's specific identity or the user's behaviors and preferences that can be probabilistically used to determine the user's specific identity). In some embodiments, the content delivery network can generate an encrypted, electronic token based off all the retrieved information, and that token can be provided to the publisher, which can be passed around in one or more communications that take place in the digital advertising ecosystem when an impression opportunity is auctioned off. Thus, in some embodiments, all the entities in the digital advertising ecosystem can conduct the auction as normal while using the token to refer to the associated user.

In some embodiments, the appropriate owner of data may be able to give different levels of permission to the entities of their choosing (e.g., subscribers) to retrieve the data they own from the token. For example, an advertiser may be able to grant access for a subscriber to retrieve personally-identifying information for a user from the token. Thus, entities may not have access to any information about the user, except for the entities that have been provided a method for decrypting the token, and those entities would only be able to access the user data on the token as permissioned by the owner of the user data. In some embodiments, the owner of the data may be able to enable different levels of permission to the entities of their choosing (i.e. subscribers). In some embodiments, only the content delivery network has access to all the collected information associated with each user identity, which provides user identity protection and prevents the sharing of user data between the participants of the digital advertising ecosystem, so that any entity in the digital advertising ecosystem cannot collect and track user data over time in order to associate user preferences and behavior to a unique user identity.

In some embodiments, an approach for integrating a content delivery network within the digital advertising ecosystem is to have the content delivery network handle the processing associated with header bidding, such that the content delivery network simultaneously sends out bid requests (and receives the corresponding bid responses) for an impression opportunity to a large number of entities at the same time. In this manner, the content delivery network can be used to offload the processing associated with auctioning an impression opportunity that would be performed by the user device, publisher ad server, or any supply-side entity. In some embodiments, this would allow the publisher to maximize ad revenue without the risk of any slowdowns associated with that processing when the bid requests are being sent to a potentially large number of different entities. Furthermore, this approach can be combined with the aforementioned approach for protecting user identities by having the content delivery network manage user identities and issue encrypted tokens to be sent out with the bid requests.

In some embodiments, an approach for integrating a content delivery network within the digital advertising ecosystem is to have the content delivery network manage site tracking (for example, the browsing and activity of a user across different websites) of users. Traditionally, site tracking has been individually performed by third-party tracking entities (for example, advertisers or advertisement platforms) that utilize a tracking pixel to generate a cookie on the user's device. However, this site tracking functionality can be limited and in order to obtain better profile of the users, these entities constantly share their data on a particular user through techniques such as cookie syncing and piggybacking pixels. Although the content delivery network could be used to manage and store all user data associated with a user identity (for example, by having all these entities share their data with the content delivery network), in some embodiments, these entities could also continue to use their existing techniques for sharing user data, with the content delivery network serving to help manage and simplify that sharing. In particular, the content delivery network can be used to host the syncs (e.g., pixels) and manage the syncs (for example, user mappings) for all these tracking entities instead of having each entity host their own syncs. In some embodiments, a master tracking tag can be used to deliver the appropriate syncs to the user device as the user accesses a website, and this delivery would also be faster since the syncs would be stored and delivered by the content delivery network itself.

In some embodiments, an approach for integrating a content delivery network within the digital advertising ecosystem is to have the content delivery network manage and distribute forwarded bids. The content delivery network can be used as a middleman to receive a large number of bid requests for impression opportunities and forward the appropriate bid requests to each subscribing recipient (for example, advertisers or DSPs) based on filters or pre-defined criteria established by the recipient. In some embodiments, the content delivery network can even be entrusted to perform bidding for the recipients based on bidding algorithms provided to the content delivery network. In some embodiments, this would serve to improve publisher ad revenue in a way that minimizes network traffic and wasted communications, by allowing bid requests for impression opportunities to be sent to the broadest audience possible (a potentially large number of recipients) based on filtering criteria established by the recipients.

In some embodiments, the content delivery network may be used to map user identities for use within the digital advertising ecosystem. In some embodiments, the content delivery network may be used for cookie syncing for third-party cookies or first-party cookies (e.g., mapping user identities to the cookies associated with different sites). In some embodiments, the content delivery network may be used to map user identities directly to user identities.

FIG. 1A is a block diagram illustrating an example system 100, according to some embodiments of the present disclosure. The example system 100 may include a content delivery network (CDN) 110, one or more publishers 115, one or more users 120 operating one or more user devices 125, one or more advertisers 130, one or more demand-side platforms (DSP) 135, and one or more supply-side platforms (SSP) 140. The example system 100 may also optionally include one or more site optimization vendors 145 and/or one or more site analytics vendors 150. For the purposes of simplicity and facilitating understanding of the example system 100, the components of the example system 100 may be described singularly (for example, in the context of a single publisher 115, and so forth). However, it should be noted that in practice, there can be any number of each of the components within the example system 100.

The components of the example system 100 may be communicatively coupled to one another via the internet 105, and the CDN 110 may operate as a layer in the internet 105 in order to provide high-availability and high-performance content delivery to end-users (for example, any of the components in the example system 100, including—but not limited to—the user devices 125).

In some embodiments, the CDN 110 may be a geographically distributed network of nodes (for example, proxy servers) and their associated data centers. The CDN 110 may utilize internet service providers (ISPs), carriers, and network operators for hosting its nodes, servers, and data centers. In turn, content owners, including the components of the example system 100, may utilize the CDN 110 to store and deliver their content to end-users, including other components in the example system 100. In some embodiments, since the CDN nodes are in different locations, this allows the content delivery service to be spatially distributed relative to the receiving end-users. The appropriate CDN node to use for delivering content to a specific end-user can be optimally selected (for example, to optimize for performance), such as by choosing a node with the fewest hops or the least number of network seconds away from the requesting end-user, or the highest availability in terms of server performance (both current and historical), and so forth. Storing and delivering content through the CDN 110, as opposed to via centralized server, may yield benefits that include reduced bandwidth costs, improved content load times, or increasing global availability of content. The CDN 110 may be used to deliver a large variety of Internet content, including web objects (text, graphics and scripts), downloadable objects (media files, software, documents), applications (e-commerce, portals), live streaming media, on-demand streaming media, and so forth.

In some embodiments, the CDN 110 may be an edge cloud network, such as an IoT edge cloud network, that is capable of performing edge computing (for example, performing processing at the edge of the network, close to the end-device). In some embodiments, the CDN 110 may have a cloudlet, which is a mobility-enhanced small-scale cloud datacenter that is located at the edge of the Internet. The main purpose of the cloudlet is supporting resource-intensive and interactive mobile applications by providing powerful computing resources to mobile devices with lower latency. Such configurations for the CDN 110 may utilize decreased bandwidth, reduce network load, and allow for computation offloading for real-time applications. In some embodiments, the CDN 110 may be any cloud provider with a mechanism for distributed key value transaction processing and computation at the edge.

In some embodiments, the CDN 110 may be entrusted to perform functions associated with identity and access management (e.g., identity translation or identity escrow) for the participants of the real-time bidding process. More specifically, in some embodiments, the CDN 110 may perform identity management functions, such as identity management functions associated with the processing of personally identifiable information (PII), which is any data that could potentially identify a specific individual, distinguish one person from another, or be used for de-anonymizing previously anonymous data. These identity management functions may include: receiving, holding, or protecting personally identifiable information (PII); holding or processing metadata on the PII; encrypting, hashing, or tokenizing PII; and/or delivering encrypted or tokenized PII. In some embodiments, the CDN 110 may perform data management functions, such as performance aggregation and "clean room" data processing involving receiving log level data (e.g., bid, impressions, online events, attributed event, etc.); processing log level data into aggregated performance data; receiving or producing tokens/pseudonymous identifiers for use in data processing or safe delivery to a third party; delivering processed performance data and/or log level data to permission parties; and/or intaking third-party algorithms, training third-party algorithms on permissioned logs, and enabling use of the third-party algorithms for activation in real-time or on an ad hoc basis.

In some embodiments, the publisher 115 may be a content creator with the opportunity to earn revenue for displaying advertisements with their content. The content and advertisements can be displayed to users through a variety of technological platforms. For instance, the publisher 115 may be a web site owner and users accessing a web page on the site can be displayed advertisements. As another example, the publisher 115 may be a streaming video service operator and users accessing streaming video content via an application on their electronic device can be displayed video advertisements.

In some embodiments, the user 120 may use a user device 125 to access the content provided by a publisher 115. For instance, the user device 125 may be a computer, mobile device, smart television, and so forth.

In some embodiments, the advertiser 130 may be any entity willing to purchase an impression for displaying an advertisement with the content of the publisher 115.

In some embodiments, the DSP 135 is a system that allows buyers (for example, advertisers) of digital advertising inventory to manage multiple ad exchange and data exchange accounts through one interface. By utilizing a DSP, advertisers can manage their bids for the impressions and the pricing for the data that they are layering on to target their audiences.

In some embodiments, the SSP 140 is a technology platform that enables publishers (for example, web site publishers and digital media owners) to manage their advertising space inventory, fill it with ads, and receive revenue. Publishers may use a supply-side platform to automate and optimize the selling of their impression opportunities.

Figure 1B:
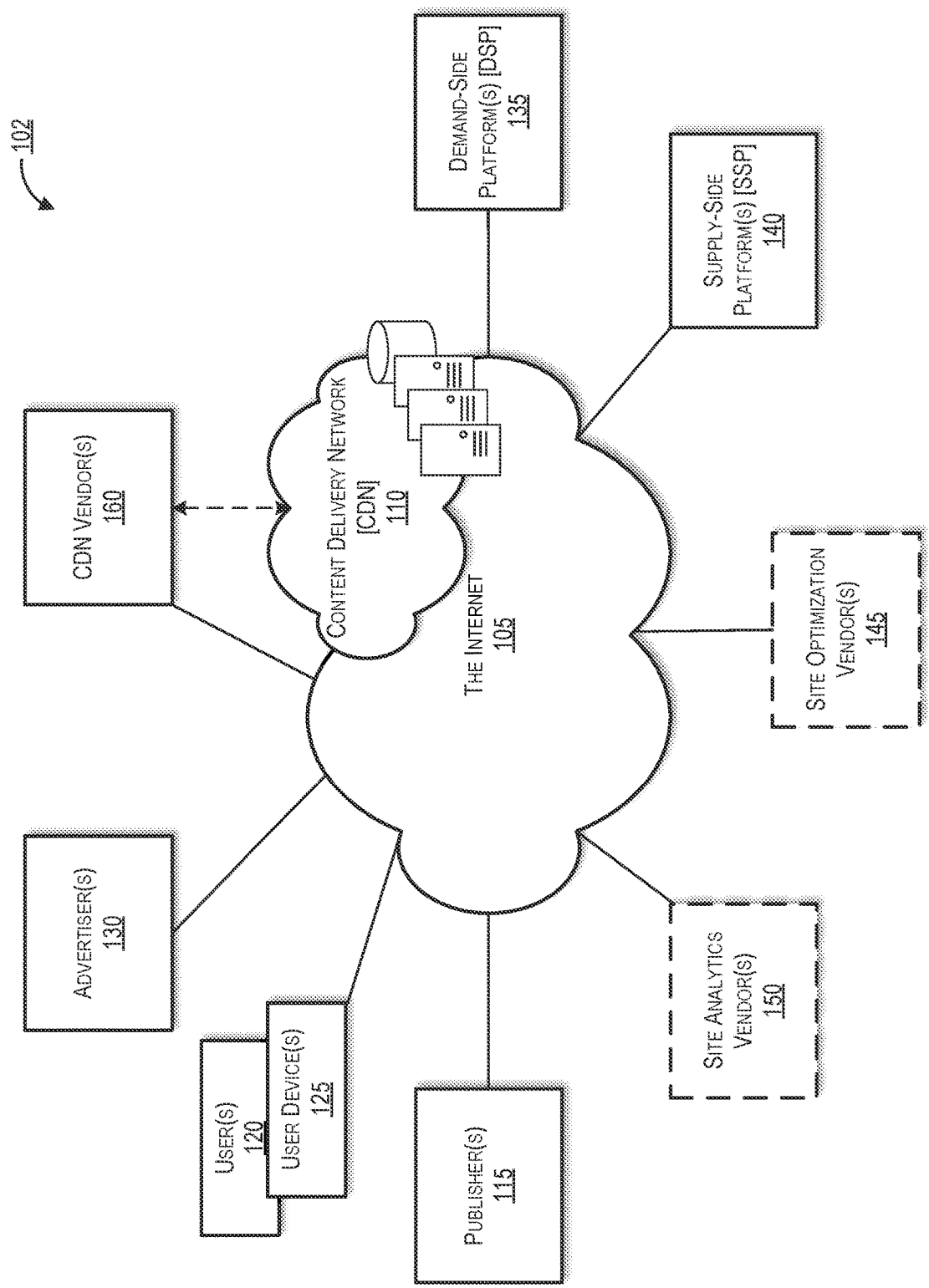
FIG. 1B is a block diagram illustrating an example system, according to some embodiments of the present disclosure.

FIG. 1B is a block diagram illustrating an example system 102, according to some embodiments of the present disclosure. The example system 102 of FIG. 1B may be very similar to the example system 100 of FIG. 1A; the example system 102 may include a content delivery network (CDN) 110, one or more publishers 115, one or more users 120 operating one or more user devices 125, one or more advertisers 130, one or more demand-side platforms (DSP) 135, and one or more supply-side platforms (SSP) 140, one or more site optimization vendors 145, and/or one or more site analytics vendors 150. Thus, the descriptions of these components are not repeated. However, in comparison to example system 100, the example system 102 may further include one or more CDN vendors 160. As referred to herein, the term "CDN vendor" is not to be confused with an entity offering CDN services (e.g., another CDN), but rather encompasses any technology vendor that the CDN has chosen to offload any functions or work to (e.g., managing user mappings or preferences).

In some embodiments, there may be various functions that are entrusted to the one or more CDN vendors 160 to perform on behalf of the CDN 110 as a translation layer between the CDN 110 and the participants of the real-time bidding process or as a third party facilitator of the real-time bidding process. For instance, the CDN 110 may utilize the one or more CDN vendors 160 to manage one or more databases and perform identity and access management functionality (e.g., identity translation or identity escrow) for the participants of the real-time bidding process. The CDN 110 may also utilize the one or more CDN vendors 160 to manage performance aggregation functionality (e.g., "clean room" data processing).

In some embodiments, the CDN vendors 160 may perform identity management functions, such as identity management functions associated with the processing of personally identifiable information (PII), which is any data that could potentially identify a specific individual, distinguish one person from another, or be used for de-anonymizing previously anonymous data. These identity management functions may include: receiving, holding, or protecting personally identifiable information (PII); holding or processing metadata on the PII; encrypting, hashing, or tokenizing PII; and/or delivering encrypted or tokenized PII.

In some embodiments, the CDN vendors 160 may perform performance aggregation and "clean room" data processing functions, such as receiving log level data (e.g., bid, impressions, online events, attributed event, etc.); processing log level data into aggregated performance data; receiving or producing tokens/pseudonymous identifiers for use in data processing or safe delivery to a third party; delivering processed performance data and/or log level data to permission parties; and/or intaking third-party algorithms, training third-party algorithms on permissioned logs, and enabling use of the third-party algorithms for activation in real-time or on an ad hoc basis.

Figure 2:
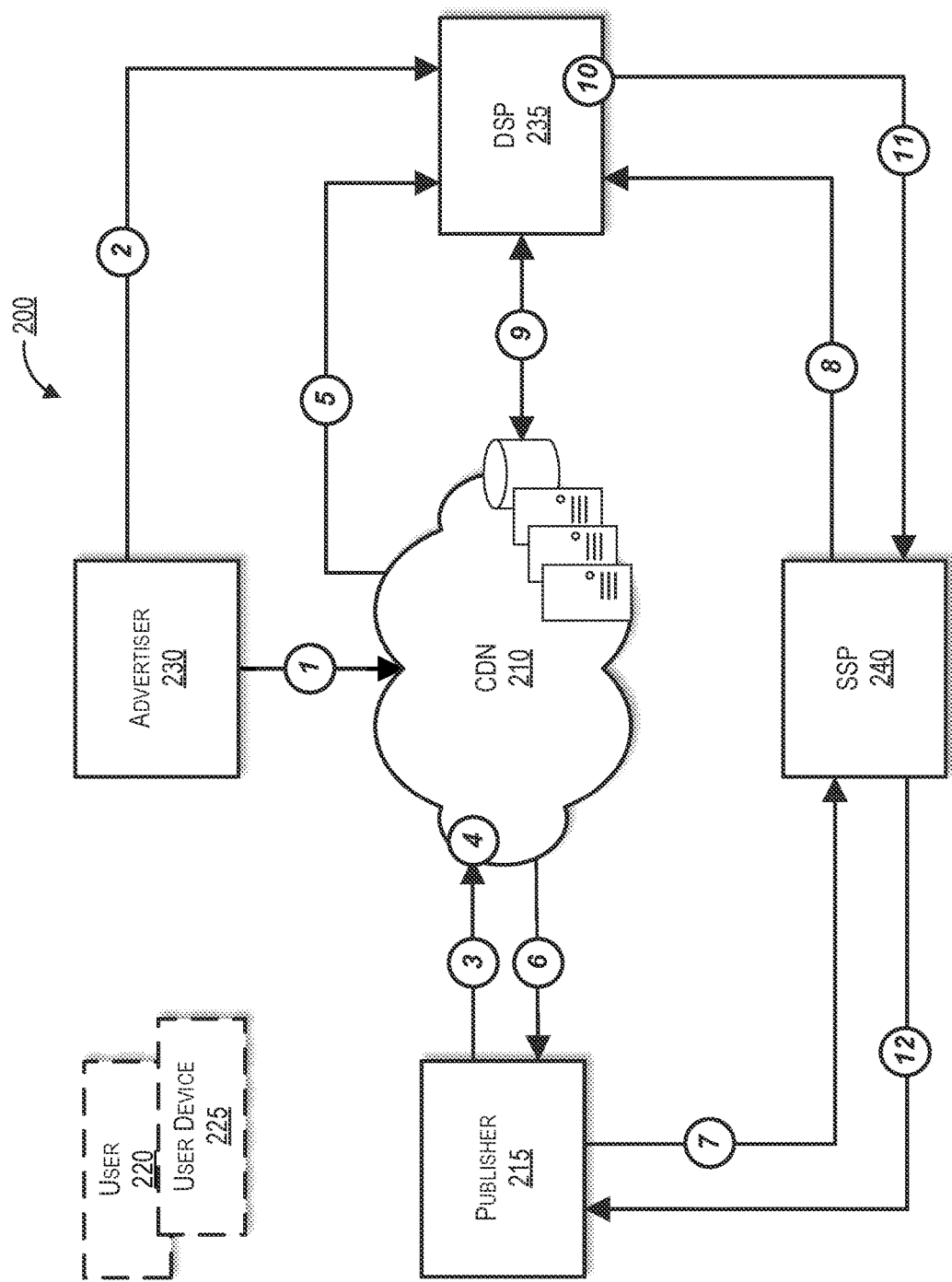
FIG. 2 is a data flow diagram illustrating an example process for using a CDN to protect user identities within a digital advertising ecosystem, according to some embodiments of the present disclosure.

FIG. 2 is a data flow diagram illustrating an example process 200 for using a CDN 210 to protect user identities within a digital advertising ecosystem, according to some embodiments of the present disclosure. It should be noted that FIG. 2 is primarily described within the context of having a CDN 210 identify users using deterministic identifiers. However, in some embodiments, probabilistic identifiers may be used instead and the CDN 210 (or a CDN vendor tasked with managing the user database) may execute code to identify users probabilistically, and then the CDN 210 may pass those probabilistic identifiers to parties within the digital advertising ecosystem (e.g., participants of a real-time bidding process).

At circle 1, an advertiser 230 may provide a set of information to the CDN 210, and the set of information may include a deterministic identifier associated with a user (for example, user 220) and details associated with market segment membership/association or browsing/purchasing behavior/preferences of the user (for example, information regarding the particular user's preferences for products, services, or businesses, and so forth). This transmitted set of information may be collected from any suitable source, such as from first party data collected by the advertiser 230. For instance, this information can be collected from software running on the user device 225 when the user 220 utilizes the user device 225 to browse or purchase goods or services. Or, the information may have been provided and made available to the advertiser 230 by a third-party, such as from data collected by the publisher 215.

The deterministic identifier associated with a particular user may be a lexical token (for example, any combination of words, numbers, letters, or symbols) that is associated with any type of suitable identifying data that has been collected for the particular user (for example, such as usernames, logins, registration data, emails, offline customer data or IDs, and so forth) or derived from such data (for example, a hash). Any privacy concerns associated with directly revealing personally identifiable information for the user can be addressed by implementing a deterministic identifier that obfuscates that information (for example, coding the deterministic identifier into a long string of integers, hashing/encrypting the information to generate the deterministic identifier, and so forth). The deterministic identifier may make it possible to determine with certainty that the rest of the data in the transmitted set of information data relates to that particular user.

The information regarding the browsing or purchasing behavior of the user, or the user's preferences for products, services, or businesses, may include details tied to those goods or services. For instance, the information may include attributes or identifiers (for example, a product identifier) associated with those goods and services, the price that the user paid, common features offered among a group of closely-related goods the user viewed, and so forth.

The CDN 210 may store this received information by indexing it to the corresponding deterministic identifier (for example, store all the behavior and preferences of user 220 indexed to the user's email address) or user identity/profile associated with a user (for example, use the received deterministic identifier to look up a user identity/profile that can have many deterministic identifiers attached to it, and then store the received set of information to that user identity/profile).

It should be noted that a specific, main example is referenced throughout the discussion of the example process 200 in order to facilitate a better understanding of the example process 200, but the example process 200 may be used in various other contexts. For this main example, consider the scenario that the user 220 used an application on their user device 225 (for example, a mobile device) to purchase a particular brand of diapers associated with the advertiser 230. The advertiser 230 may be able to collect first party data from the purchase through the application (especially if the application was provided by the advertiser 230), which could include a deterministic identifier (for example, email associated with the user 220 used for the purchase) and details or attributes associated with the purchase (for example, a product identifier for that specific diaper product). The advertiser 230 can send this information to the CDN 210 to be saved.

Although only one advertiser 230 is shown in the figure, it should be understood that there can be multiple advertisers which collect information and send it to the CDN 210 to be saved. In some embodiments, the CDN 210 may have an ingestion mechanism for intaking information (e.g., user PII, such as a phone number or email address) from various advertisers, extracting the PII from the information, hashing or encrypting the PII, and then storing that PII in one or more databases that correspond to the data collected by different advertisers. The CDN 210 may also track and manage contractual relationships between different entities in the digital advertisement ecosystem (e.g., publishers and advertisers), such as via one or more databases. For a particular bid opportunity offered by a publisher, the CDN 210 may be able to check which advertisers have a contract with the publisher using an identity resolution mechanism. Advertisers with contractual relationships may be allowed to bid on the bid opportunity. Furthermore, the CDN 210 may match the user PII associated with the bid opportunity to the PII collected by an advertiser (and ingested/stored by the CDN 210) in order to provide the advertiser with their collected PII for making bid decisions. In order to do this, the CDN 210 may apply the same hash or encryption function to all the PII that it ingests and stores (e.g., the PII collected by different advertisers), which allows the PII for any advertiser to be matched to the user PII associated with a bid opportunity.

At circle 2, the advertiser 230 may determine the details for an ad campaign and send that information to a DSP 235 to use for evaluating and bidding on impression opportunities during the real-time bidding process. This ad campaign may be directed to a first party audience or a segment of a first party audience, for which the advertiser 230 may have first party data (for example, data collected directly from the audience, which can include customers, site visitors, app users, social media followers, and so forth) or a deterministic identifier for. The ad campaign may also be directed at particular publishers or types of publishers. For instance, within the context of the main example, the advertiser 230 may inform the DSP 235 that they wish to purchase impressions with publisher 215 for their first party audience that bought a brand 'X' of diapers (for example, diapers offered by the advertiser 230). In some embodiments, the ad campaign may include a pre-cached bid that specifies a price the advertiser 230 is willing to pay for impressions that meet their criteria.

At circle 3, the publisher 215 may provide information to the CDN 210 on any available impression opportunities (for example, with the publisher 215) that will later be sent to the SSP 240. This information may include any deterministic identifiers of users that are logging-on or accessing content provided by the publisher 215. For instance, within the context of the main example, the publisher 215 may provide, to the CDN 210, a deterministic identifier (for example, email) associated with the account (for example, account with the publisher 215) of a user 220 accessing content provided by the publisher 215. The publisher 215 could determine the deterministic identifier associated with the user 220 when the user 220 logs on to a website or a streaming video application of the publisher 215.

At circle 4, the CDN 210 may create an encrypted, electronic token for the deterministic identifier received from the publisher 215 (for example, at circle 3). The token may contain available information about segment membership/association for the user associated with the received deterministic identifier, which the CDN 210 can look-up and retrieve based on the received deterministic identifier. This token should not contain the received deterministic identifier, any other deterministic identifiers associated with the user, or any other personally identifiable information for the user. For instance, within the context of the main example, the CDN 210 may receive from the publisher 215 (for example, at circle 3) an email address for user 220 and check to see if any segment membership/association information exists for that email address or a user identity/profile associated with that email address. Either case would suffice here if the user 220 used the same email address with the advertiser 230 and the publisher 215, as the deterministic identifier received from the publisher 215 (for example, at circle 3) would match the deterministic identifier received from the advertiser 230 (for example, at circle 1) and can be used to look-up and retrieve the available segment membership/association (for example, stored at circle 1). In this case, the segment membership/association information for user 220 included in the token would indicate that the user 220 is a first party audience of advertiser 230 and has purchased brand 'X' diapers.

At circle 5, the CDN 210 may pass the encrypted, electronic token (for example, generated at circle 4 for the deterministic identifier received from the publisher 215) to the DSP 235. In some embodiments, the CDN 210 may proactively push the token to the DSP 235 (e.g., the DSP 235 may have an endpoint listening for push requests).

At circle 6, the CDN 210 may pass the encrypted, electronic token (for example, generated at circle 4 for the deterministic identifier received from the publisher 215) to the publisher 215, which the publisher 215 can submit alongside a bid request.

At circle 7, the publisher 215 may include the encrypted, electronic token with a bid request to a SSP 240. The bid request may contain standard bid request information, examples of which include publisher information and settings; platform information and settings; and any relevant user-data available to the publisher 215, including geographical location, IP address, cookies, and so forth.

At circle 8, the SSP 240 may send a bid request to the DSP 235 along with the encrypted, electronic token received from the publisher 215. Again, this bid request may include standard bid request information, including publisher information and settings, platform information and settings, and so forth. The bid request may also contain additional information included by the SSP 240. In some cases, the bid request may include any relevant user data available to the publisher 215, including geographical location, users cookies, IP addresses, and so forth.

However, it should be noted that, in order to truly obfuscate user data and user identities from DSP 235, this bid request should not include any unique identifiers or any "persistent" identifiers such as IP address. Otherwise the DSP 235 will be able to associate the impressions that it bids upon (on behalf of advertiser 230) with the unique or persistent identifiers in its logs and track the impressions that have been associated with a particular unique or persistent identifier. However, obfuscating user identities in this manner would obstruct the ability of DSP 235 to run attribution and track its performance (for example, for reporting back to the advertiser 230), since the encrypted token would rotate and is, by itself, insufficient for this purpose. In order to provide log data back to the advertiser 230 and properly run attribution, there would need to be a subsequent set of steps performed (not shown) following the example process 200. These steps may include providing the CDN 210 with the win notification indicating the winning bid and price. The CDN 210 may decrypt the token associated with the impression opportunity and pass bid data to the advertiser 230 in real time, which stores the bid data. The advertiser 230 can then run attribution and notify the DSP 235 of performance (for example, aggregate performance for an in-UI visualization or feature-level performance to update algorithm coefficients). Furthermore, obfuscating user identities in this manner would also obstruct the ability of DSP 235 to frequency cap users (for example, if the advertiser only wants to reach a user 3x per day, then the DSP 235 would not be able to measure this). Additionally, it would obstruct the ability of DSP 235 to conduct its own geographic identification from IP addresses (versus relying on location data received in the bid request). For example, the DSP 235 may use an IP address to determine where a user is located in order to honor geo-targeting restrictions (e.g. "only target users in Texas"). Compared to the aggregation of performance data (which can be performed in a batch, e.g., daily), these examples may require a closer to real-time notification from the CDN 210. For instance, if an identity were completely obfuscated from the DSP 235, in order to conduct legitimate frequency capping, the DSP 235 would have to receive a metadata signal included in the token with the user frequency measurement (e.g., there have been two impressions from this advertiser on this user so far today).

These reconciliation steps may be important because, in some circumstances, if a DSP does not have access to user IDs (e.g., cookie/device IDs) in log level data, then the DSP is unable to perform certain critical functions, including attribution and frequency management. Thus, obfuscation of cookie/device IDs from the DSP without additional safeguards may impact the functionality of the DSP outside the context of this tokenized-CDN process described herein. There may be other additional downstream impacts from not providing DSP access to user IDs in log level data, including the inability to provide performance reporting (which fuels in-UI performance visualizations, expected by users of a DSP) and the inability to ingest conversion data into bidding algorithms. These reconciliation steps may serve to rectify the effects of obfuscating cookie/device IDs from the DSP.

For instance, these reconciliation steps may enable frequency management. For instance, the frequency regarding the number of times a particular user has been served an impression via this tokenized-CDN process may be retrievable from the encrypted token. However, since it's possible (and likely) that an advertiser would also be buying impressions on a given user outside of this tokenized-CDN process, the DSP would need to merge the frequency count of the tokenized-CDN impressions with the frequency count of non-CDN impressions to honor an advertiser's holistic frequency settings. For example, if "user123" is served 2 impressions via the tokenized-CDN workflow represented by the example process 200, and 3 impressions outside of the tokenized-CDN workflow, the DSP would need to recognize a total frequency of 5.

The reconciliation steps may also enable tracking and reporting of performance data. Log level data for impression purchases across CDNs and non-CDN may be accessible by the advertiser or the CDN, who could merge the datasets and run attribution. Without log data that includes the user ID (for example, a cookie, device ID, IP address, other user token, etc.), some types of common aggregate performance data is impossible for the DSP to construct on their own, meaning whichever entity merged the log data and ran attribution would need to notify the DSP of aggregate performance in order for expected data notifications and visualizations to be present in the DSP user interface. A few types of aggregate performance data would still be possible to construct depending on the advertiser's marketing goals. For example, an advertiser may just want to see a certain cost per click or spending of a certain budget level.

The reconciliation steps may also enable the conversion of relevant data into bidding algorithms for an advertiser. In general, DSPs will take log data and attributed events into consideration when scoring bid opportunities for advertisers. Without access to the all the log data for an advertiser, the DSP would be far less equipped to generate an algorithm specific to the advertiser in question. This can be fixed by having the advertiser (or an entity acting on the advertiser's behalf) to notify the DSP of updates to bidding algorithms for the advertiser based on learnings gleaned from the merged log data, although not all DSPs will have functionality enabling an advertiser to update their bidding algorithm.

It should also be noted that, in some embodiments, circle 8 and its associated steps may not be need to be performed in the manner illustrated. For instance, in some embodiments, the DSP 235 may not receive the bid request for filtering bids based on bid opportunity attributes, and SSP 240 may send a bid request to the advertiser 230. In some embodiments, the CDN 210 may be capable of performing computations (for example, edge computations) and can make bidding decisions on behalf of the DSP 235. For instance, the DSP 235 can provide the CDN 210 with bidding logic associated with the ad campaign provided by the advertiser 230, which would make it unnecessary for the SSP 240 to send a bid request to the DSP 235.

The DSP 235 may attempt to decrypt the token that it received in order to read the segment membership/association information on the token, so that the DSP 235 can learn more about the impression opportunity being offered and if lines up with the advertising campaign specified by the advertiser 230. Any suitable encryption/decryption scheme may be used with the token. For instance, the token may be encrypted by the CDN 210 using a symmetric key algorithm (for example, encrypting the token with a shared secret that is known to both the CDN 210 and the DSP 235) or an asymmetric key algorithm with the decryption key known to the DSP 235. The DSP 235 would be able to decrypt the token, while the publisher 215 or the SSP 240 would remain unable to decrypt the token.

In the case that the DSP 235 cannot decrypt the token, at circle 9, the DSP 235 may be able to contact the CDN 210 in order to obtain the information about advertiser ownership and segment membership/association that is on the token. In some cases, the CDN 210 may send any segment membership/association that it has on file (for example, from first-party data collected by one or more entities, such as multiple advertisers) for that particular user.

At circle 10, the DSP 235 may determine if the audience associated with the impression opportunity should be bid on (for example, on behalf of advertiser 230) based on the ad campaign established by the advertiser 230. Then, at circle 11, the DSP 235 may send the bid response back to the SSP 240 based on its determination.

For instance, within the context of the main example, the DSP 235 may determine from the information on the token that the impression opportunity is associated with user 220, whose segment membership/association information indicates is a first party audience of advertiser 230 and has purchased brand 'X' diapers. In addition, this impression opportunity is offered by the publisher 215, so all the criteria for the ad campaign established by the advertiser 230 are met. Thus, the DSP 235 would bid on this impression opportunity and send the bid response to SSP 240. In some embodiments, the bid response may include a price for the bid and/or instructions for retrieving the advertisement (for example, associated with advertiser 230) to be displayed, such as a link or URL for the advertisement that is stored at an ad server (not shown).

At circle 12, assuming that the bid response received from the DSP 235 is the winning bid, the SSP 240 would send the received bid response back to the publisher 215. The publisher 215 (or in some cases, the publisher ad server) may then act on the instructions for retrieving the advertisement to be displayed. For instance, if the user 220 is accessing content of the publisher 215 via a web browser, the publisher 215 may use a still-open HTTP connection to inform the web browser to retrieve the ad from the ad server (for example, using the provided link or URL in the bid response) and display it on the web page. Alternatively, if the user 220 is accessing streaming video from the publisher 215 through an application (for example, a mobile app), the publisher 215 could inform the application to retrieve a video ad from the ad server (for example, using the provided link or URL in the bid response) and play it in the application.

A win notification can then be sent out at impression time (for example, once the ad is retrieved and rendered on the user device 225), such as by the SSP 240 to the DSP 235 for attribution. As previously mentioned however, if user identities are fully obstructed, the DSP 235 would not be able to run attribution and track performance. One possibility is that the SSP 240 may send a win notification to the CDN 210 indicating the winning bid and price. The CDN 210 may decrypt the token associated with the impression and pass the bid data back to the advertiser 230 in real time, which stores the bid data. The advertiser 230 can then run attribution instead of the DSP 235 and then notify the DSP 235 of performance.

It should be noted that most of the example process 200 shown can occur within a fraction of a second, or may be designed to occur within a fraction of the second. For instance, the actions associated with circles 3-12 (for example, the determination of an ad to display to a user) may be performed within the time it takes for the user 220 to access, retrieve, and render content from the publisher 215. Thus, speed and efficiency may be of the essence and the integration of the CDN 210 in the manner shown in the example process 200 may provide that necessary speed and efficiency, while also serving to protect user identities within the digital advertising ecosystem.

It should also be noted that the example process 200 involves the use of a deterministic identifier, and other processes or workflows may be required when only probabilistic identifiers such as cookies and/or IP address are available.

Figure 3:
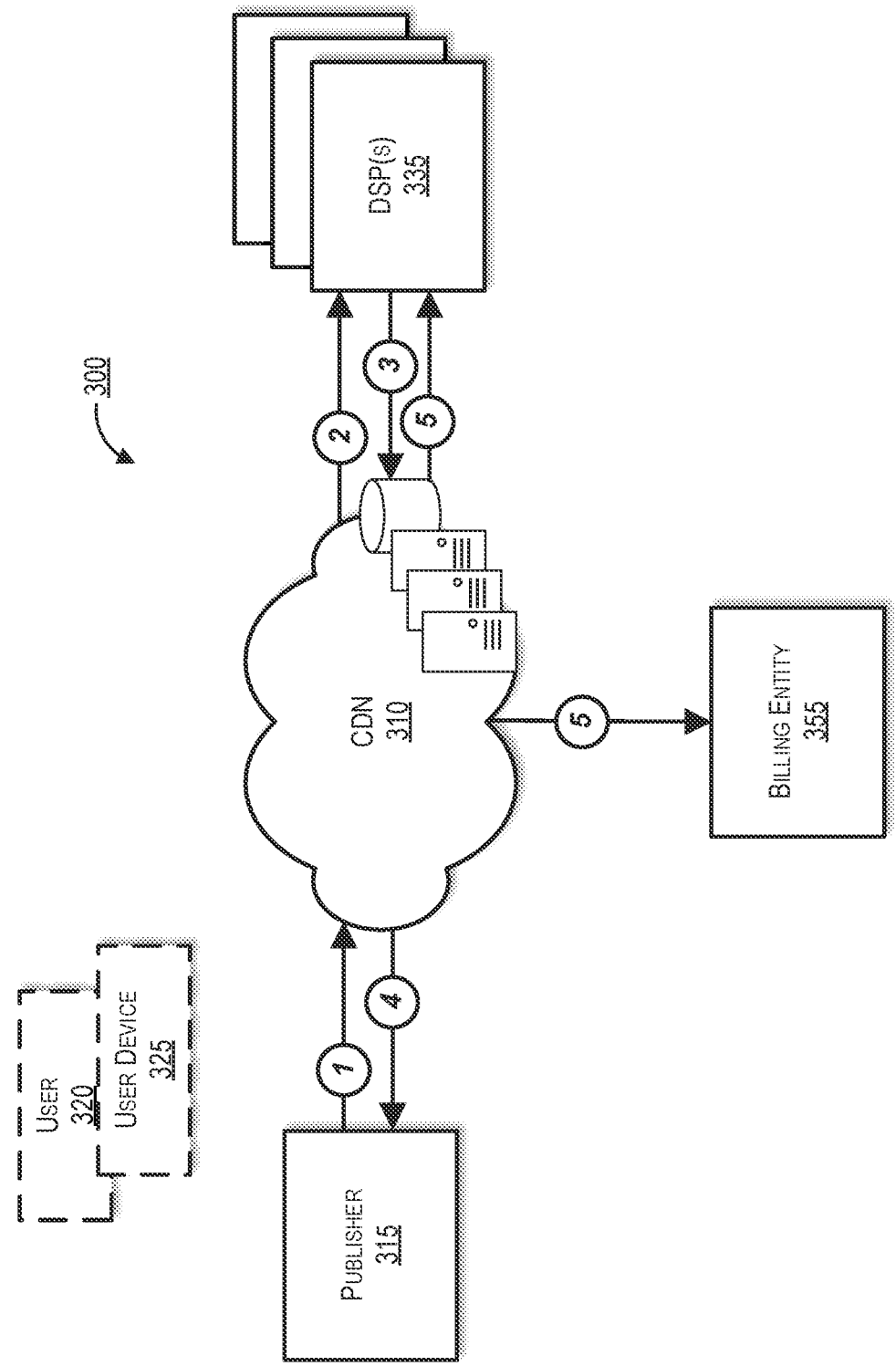
FIG. 3 is a data flow diagram illustrating an example process for using a CDN for conducting header bidding within a digital advertisement ecosystem, in accordance with some embodiments of the present disclosure.

FIG. 3 is a data flow diagram illustrating an example process 300 for using a CDN for conducting header bidding within a digital advertisement ecosystem, in accordance with embodiments of the present disclosure.

In many instances, publishers will attempt to maximize their revenue from a real-time bidding auction using a method that has been referred to as the "waterfall" method. Under the waterfall method, publishers will try to maximizing their revenue in a RTB auction by offering their ad space to each ad exchange in a sequential, cascading fashion. More specifically, the publisher may assign a price floor to an impression opportunity and then offer it to bidders (for example, ad exchanges, such as DSPs)— one bidder at a time. If there are advertisers at the first ad exchange bidding over the price floor, then the advertiser with the highest bid would win the auction for the impression opportunity. However, if at the first ad exchange, there are no bids from advertisers over the publisher's price floor, then the impression opportunity is sent to the next ad exchange but with a lower price floor assigned to the impression opportunity. This continues until there is an advertiser at an exchange that bids high enough over the price floor. One major problem with this waterfall method is that an advertiser in a lower of stage of the waterfall may be willing to pay more than an advertiser at a higher stage, but they will never get the chance to bid on the impression opportunity if a bid is accepted at the higher stage.

In order to address this issue, header bidding may be used instead. Under header bidding, all participants bid at the same time, which allows the publisher to earn maximum revenue. For web-based content, this can be accomplished by embedding code in the header of the publisher's webpage that requests bids from several ad exchanges at once. Header bidding is then conducted client-side (for example, through a browser on the user device), with the browser relied upon for handling the different bid requests with the various individual ad exchanges. However, there can be problems arising from implementing header bidding in this manner. It can be a long, complicated, and counterintuitive process for publishers to setup header bidding on their sites. Furthermore, browsers are optimized for displaying web pages to the user, and having the browser additionally conduct header bidding places heavy demands on the browser and can slow down considerably the speed at which content loads.

The illustrated example process 300 is one approach contemplated by this disclosure for addressing the technical shortcomings of header bidding. In particular, the processing of bid requests for header bidding can be offloaded from the browser (for example, client side) and onto external server(s) (for example, a publisher ad server) or a compute-enabled CDN 310. Publishers would still be required to embed some code in their web pages, but most of the processing can be handled by the CDN 310, which would be faster than having the browser perform header bidding.

Generally, users accessing web-based content from publishers may set preferences in their browser or through the website for how they wish to receive targeted ads and be tracked online. There may be laws that require advertising entities to abide by a user's preferences, which vary by region, or there may be other reasons for abiding by the user's preferences. In order to honor the user's preferences, publishers must store the user consent/preferences and notify their technology partners (e.g., entities within the digital ad ecosystem) of the user's preferences. One technology used to facilitate storing and forwarding user consent is a consent management platform. In some embodiments, the publisher 315 may have consent management installed in its platform in order to store, manage, and forward user consent to other entities within the digital ad ecosystem. In some embodiments, a consent management platform may be installed on the CDN 310, which allows the CDN 310 to be the loader of publisher site content, the entity shipping out bid requests to bidding partners (e.g., DSPs), and the entity for storing, managing, and disseminating user consent/preferences. When a user accesses publisher content delivered via a CDN 310 with a consent management platform, the CDN 310 may load a consent management program, register user consent/preferences as the user accesses the publisher's content in the user's session, and then forward the user's consent and preferences along with bid requests to DSPs (e.g., DSPs 335), for impression opportunities including current user session on the publisher and future sessions on any publisher.

A user 320 may attempt to access content of the publisher 315 through their user device 325. At circle 1, the publisher 315 submits a bid request from the header to the CDN 310, along with any user data and/or session information relevant to this impression opportunity. The bid request from the header may identify all the DSPs (for example, DSPs 335) participating in the auction that would need to receive their own individual bid requests. The user data and session information may include a deterministic identifier (for example, email for the user 320), any first party data on the user collected by the publisher 315, opt-in consent from the user for enabling the CDN 310 to conduct header bidding, and so forth.

The CDN 310 will receive this information. The CDN 310 may perform a handshake using the received user data (for example, the received deterministic identifier) in order to identify the associated unique user identity and any additional user data that the CDN 310 may have on hand (for example, saved at an earlier step, such as via the process described for circle 1 in FIG. 2). In some cases, the CDN 310 may be able to collect first party data for the user from a cloudlet (for example, a mobility-enhanced small-scale cloud datacenter located at the edge) of the CDN 310. Collectively, all this user data may include any available first party data or third party data for the user, a deterministic identifier for the user, opt-in consent by the user, details associated with market segment membership/association, details associated with browsing/purchasing behavior/preferences of the user, attributes or identifiers associated with particular products or product pages (for example, offered by an advertiser), and so forth.

The CDN 310 may then generate an encrypted electronic token based on this user data. Any suitable encryption/decryption scheme may be used with the token. For instance, the token may be encrypted by the CDN 310 using a symmetric key algorithm (for example, encrypting the token with a shared secret that is known to the CDN 310 and can be shared with the DSPs 335) or an asymmetric key algorithm with the decryption key known to the DSPs 335.

At circle 2, the CDN 310 may handle the header bidding by simultaneously sending the encrypted token with a bid request to each of the DSPs 335, thereby offering the DSPs 335 the opportunity to all bid at the same time.

Each of the DSPs 335 may decrypt the token using the decryption key and review the included user data in order to determine eligibility for bidding on the impression opportunity. For instance, each of the DSPs 335 may review the bidding algorithms or ad campaigns established by the advertisers it represents, in order to determine if a bid should be placed on behalf of an advertiser (for example, the user associated with the impression opportunity fits the market segment/association or other criteria of the ad campaign) and at what price.

At circle 3, any of the DSPs 335 that have determined eligibility for bidding may send a bid response back to the CDN 310. In some embodiments, the bid response may include a price for the bid and/or instructions for retrieving the advertisement to be displayed, such as a link or URL for the advertisement that is stored at an ad server (not shown). The CDN 310 may conduct the auction for the impression opportunity based on all the received bid responses in order to determine a winning bid (for example, the highest price). If the CDN 310 is overloaded (for example, conducting too many auctions), a publisher ad server may be used to conduct the auction.

At circle 4, the CDN 310 may send the winning bid to the publisher 315 along with instructions for retrieving the advertisement to be displayed, such as a link or URL for the advertisement that is stored at an ad server (not shown).

Since the CDN 310 determined the winner of the auction, at circle 5, the CDN 310 may send out the appropriate auction notifications to the various entities. The auction notifications may include win notifications, costs taken by each party (for example, publisher, DSP, billing, consent, etc.), auction or bid data, and so forth. In particular, bid data can be sent to a billing entity 355, which may perform a billing and reconciliation function (typically a SSP function). In some cases, the billing entity 355 may be a SSP. Additionally, the auction notifications may provide all A&A (advertising and analytics) data to the DSPs 335 for transparency purposes.

It should be noted that most of the example process 300 shown can occur within a fraction of a second, or may be designed to occur within a fraction of the second. For instance, the actions associated with circles 1-4 (for example, the determination of an ad to display to a user) may be performed within the time it takes for the user 320 to access, retrieve, and render content from the publisher 315. Thus, speed and efficiency may be of the essence and the integration of the CDN 310 in the manner shown in the example process 300 may provide that necessary speed and efficiency by having the CDN 310 handle header bidding, while also serving to maximize the revenue received by the publisher 315.

Figure 4:
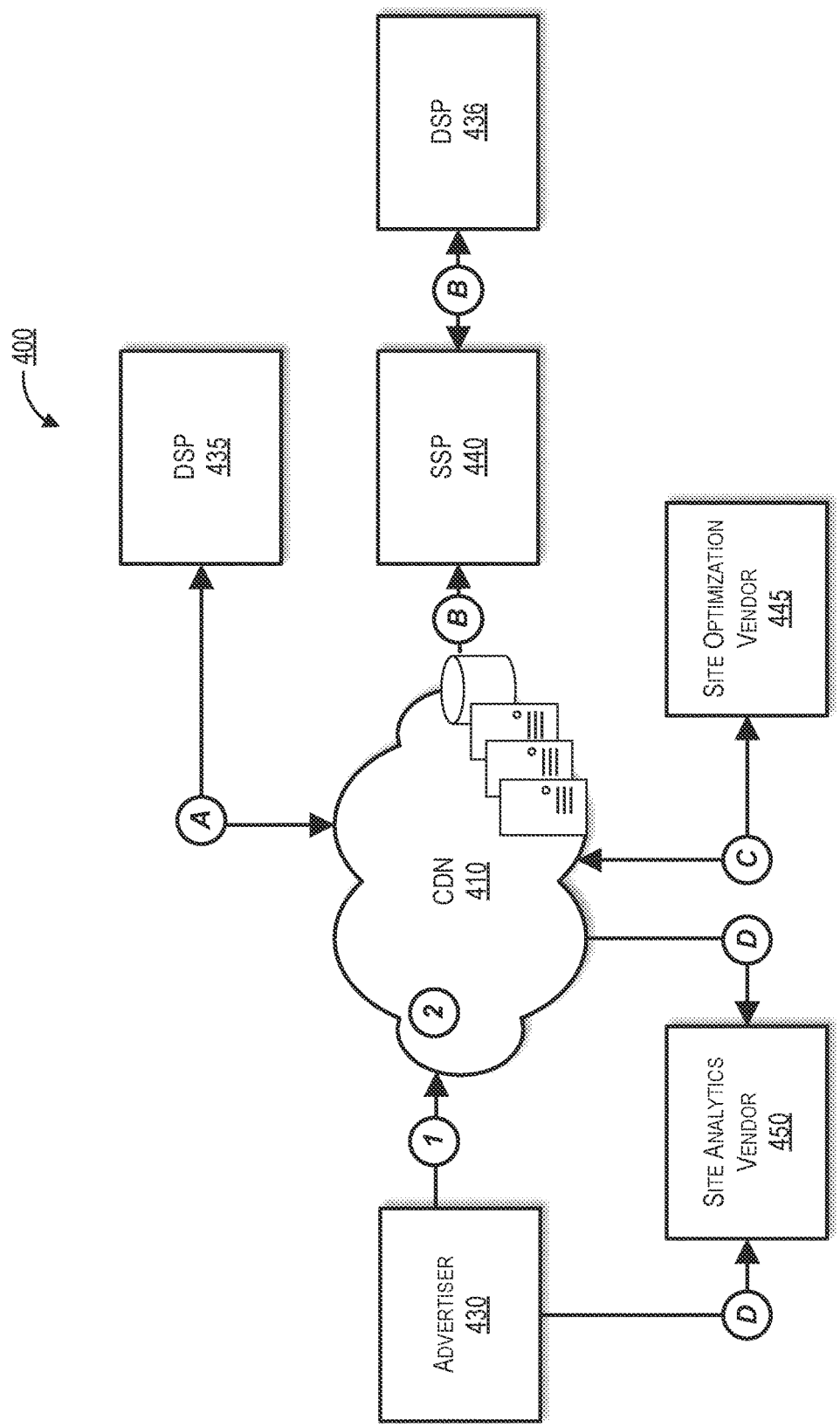
FIG. 4 is a data flow diagram illustrating an example process for using a CDN to host syncs (for example, user mappings) for participants within a digital advertising ecosystem, in accordance with some embodiments of the present disclosure.

FIG. 4 is a data flow diagram illustrating an example process 400 for using a CDN to host syncs (for example, user mappings) for participants within a digital advertising ecosystem, in accordance with embodiments of the present disclosure.

Within the context of digital advertising, site tracking of a user can initiated by a tag embedded in the content, which can include code for determining whether to retrieve a pixel from an ad server. When retrieved, a pixel may be a small block of script or code that places a cookie onto the user's browser, linking that user's web browser with their website visit. In some cases, the cookie may be a third-party cookie, which is retrieved from a different domain than the domain of the URL in the browser. These third-party cookies, also referred to as tracking cookies, are often maintained by third-party trackers (often advertisers or ad networks) and can be used to track a user's behavior, such as the content they view on that website and the things they click on (for example products and ads). The trackers can then use this information to display adverts to the user when they visit different websites.

However, cookies are domain-specific and traditional web browser technology typically allows only for identifying cookies only from the domain from which the cookie was set. Thus, an advertising platform cannot read cookies for other advertising platforms or websites, which limits the effectiveness of cookies for advertising purposes and the potential amount of information that can be collected about a user. For instance, a DSP or SSP may only be able to evaluate a cookie that they set themselves, but be unable to determine if the other side (counter party) has a cookie on that given user. However, it may be very useful to determine if another party has cookies on a given user. For instance, a DSP may wish to determine if a SSP has a cookie on a given user for bidding purposes (for example, the DSP may be willing to place higher bids on users for which the SSP already has cookies on a given user).

In order to share user data, advertising platforms perform a process known as cookie syncing, in which the user identifiers for a user are mapped from one system to another. When an advertising platform creates a third-party cookie for a user, it can perform a pixel redirect to a second advertising platform and forward the unique user identifier that it assigned to the user as a parameter (for example, http redirect the ad request to the pixel URL of the second advertising platform, passing the user ID in the URL parameter). The second advertising platform can do its own pixel redirect and send back the unique user identifier that the second advertising platform assigned to the user as a parameter. Thus, each advertising platform would maintain its own cookie-matching table that stores information for all the user identifiers (for example, assigned by the various advertising platforms participating in cookie-syncing) associated with a unique user. Alternatively, when dealing with first-party cookies for a user, the cookie syncing will require mapping first-party cookies across domains with a deterministic/probabilistic identifier. If first-party cookies and some kind of persistent ID are present, then the CDN can still perform a master mapping/notification (syncing) system across partners.

In the example process 400, the CDN 410 can be used to handle site tracking for users in a manner that would reduce publisher load times and move all tag management to the CDN 410, simplifying the tag management associated with piggybacking pixels.

At circle 1, an advertiser 430 (alternatively, a publisher, e.g., the owner of the web property) may place a CDN-owned master-tracking tag on a site for tracking a user depending on purpose. For instance, advertisers may use tags to direct a browser to a particular image or video, third-party trackers may use tags to collect segment information about users across websites, and so forth.

At circle 2, the sync pixels (or any other user ID tracking technology) can be stored and hosted by the CDN 410 for the advertiser 430 and any supply partners (for example, DSPs, SSPs, data providers, and any tech vendors). As shown in the figure, the supply partners in this instance may include the DSP 435, the DSP 436, the site optimization vendor 445, and the site analytics vendor 450. In some embodiments, the master-tracking tag may initiate the retrieval of one or more of the sync pixels from the CDN 410. Thus, the pixels would be retrieved from the CDN 410 rather than the advertiser 430 or supply partners themselves, which would be faster and reduce publisher load times. In some embodiments (not shown), the CDN 410 may even maintain its own cookie-matching table and store the user identifiers assigned by all the cookie-issuing participants to each unique user identity.

Once all the sync pixels are stored on the CDN 410, various scenarios are contemplated at this point within the example process 400, as referenced by letters A through D.

For instance, scenario A, represented by circle A, involves the CDN 410 conducting header bidding (for example, as described with regards to FIG. 3). The CDN 410 can send a bid request associated with header bidding for an impression opportunity to the DSP 435. The DSP 435 can determine that the user is eligible for targeting (for example, after decrypting the token including the user data) and submit a bid response back to the CDN 410.

Scenario B, represented by circle B, involves SSP 440 sending DSP 436 a bid request for an impression opportunity initially sent to SSP 440. The SSP 440 may be a cloud subscriber to the user identifiers of DSP 436 (for example, SSP 440 and DSP 436 may engage in cookie syncing and the mapping of user identifiers). Thus, the SSP 440 may pass a user identifier of DSP 436 for the user associated with the impression opportunity, along with the bid request. DSP 436 can use the user identifier to retrieve any collected information about the user, determine eligibility for bidding on the impression opportunity, and then send a bid response back to the SSP 440.

It should be noted that for both scenario A and scenario B, the decision (demand) latency can be reduced if the DSP published identity graph or other user data to the CDN 410 as well. This could also enable cross-device sharing for dynamic creative optimization, user attribute/segment association sharing for site optimization, and so forth.

An example scenario benefiting from reduced decision latency would be if the data within a decrypted token includes a device ID or cookie ID, and the DSP may have the opportunity to look up that ID in a device graph or identity graph to determine bid eligibility for advertisers which have enabled cross-device targeting. For example, if a decrypted token includes "cookie123", an advertiser's marketing campaign is targeting "cookie456", and the DSP has a cross-device graph which has linked "cookie123" and "cookie456", then the DSP will consider the bid opportunity eligible for the advertiser to bid on (e.g., "matched"). However, this look-up process for determining bid eligibility takes time, and the latency could possibly be reduced if the device graph were stored in full/part on the CDN 410 (which could then manage the lookup). Beyond cross-device association, the DSP may have other criteria for a "matched" impression on user IDs, such as segment association. For example, an advertiser may want to target users who have shown an interest in luxury goods, "segment789." When a bid request comes to the DSP, "segment789" must be referenced to determine eligibility (is the user associated with the impression opportunity a match, and therefore available for bidding).

If the DSP is the owner of the data (e.g., segment association data for determining if a user ID is associated with a market segment), they may also enable other entities in the advertising vendor chain to receive the same information the DSP used to inform a decision on the impression (e.g., enable other entities as subscribers of their (DSP) data). This is an ancillary benefit to the primary benefit described above (latency reduction). In other words, since the DSP already has their data stored on the CDN 410 to reduce latency, they can therefore enable access to the data in a scalable way to other entities that would benefit from the data, such as an advertiser (e.g., a dynamic creative vendor receiving cross-device association could result in a reduction of default ads being displayed to a cross-device extended first-party audience, recognized by the DSP and not the dynamic creative vendor).

Scenario C, represented by circle C, involves a site optimization vendor 445. The advertiser 430 may be able to pass user activity data to the site optimization vendor 445 through the CDN 410. The site optimization vendor 445 can run analytics on this user activity data to determine site content loading instructions specific to the user and return those instructions to the CDN 410, which can load the page content based on the instructions of the site optimization vendor 445.

Scenario D, represented by circle D, involves a site analytics vendor 450. The advertiser 430 may be able to pass user activity data to the site analytics vendor 450 through the CDN 410. The advertiser 430 may be able to use the data visualization user interface provided by the site analytics vendor 450 to interpret user activity data.

It should be noted that FIG. 4 is described within the context of sharing user data through the process of cookie syncing using third-party cookies. However, the cookie syncing functionality of the CDN 410 may be expanded to include the use of first-party cookies and using deterministic/probabilistic identifiers to link across different site domains. A first party cookie would require the CDN 410 to perform placement of the first party cookie and pair it with a deterministic or probabilistic ID to link across the first party domain. For instance, if the CDN 410 were injecting a first entity's cookie into the first party, and an advertiser wished for the ID of a second entity to be injected in the first party as well, there may be a synthetic ID that would probably be different for the first and second entities. However, the CDN 410 may have a deterministic or probabilistic identifier that can be used to link those two entities on IDs together.

Figure 5:
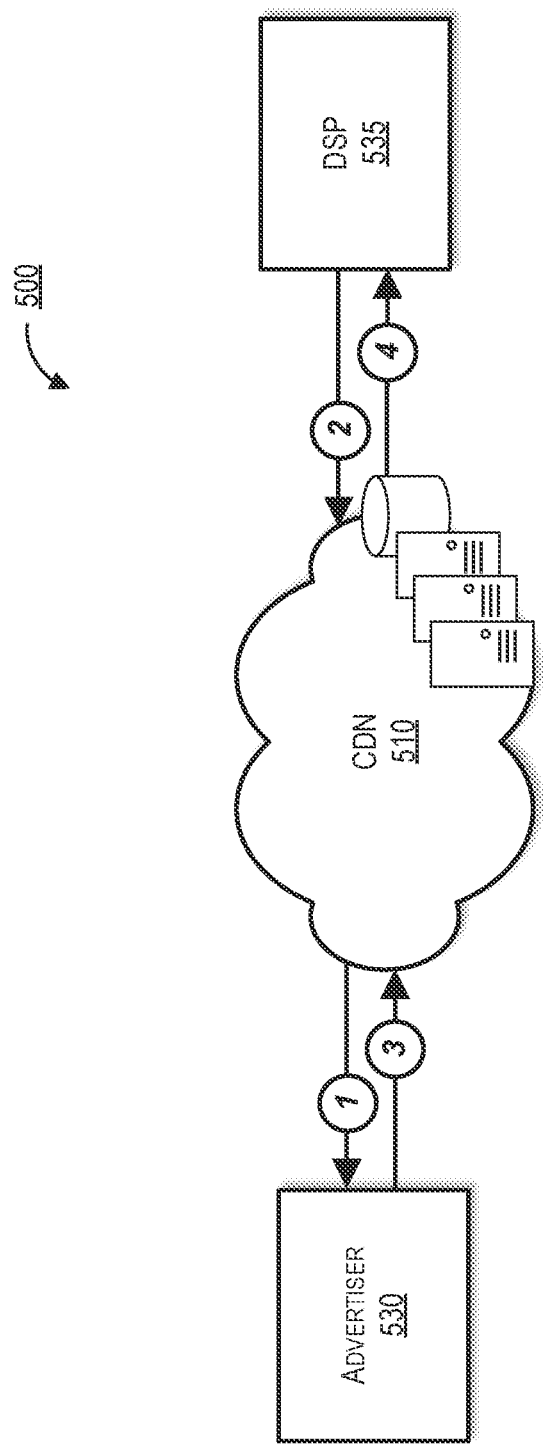
FIG. 5 is a data flow diagram illustrating an example process for using a CDN to distribute forwarded bids within a digital advertising ecosystem, in accordance with some embodiments of the present disclosure.

FIG. 5 is a data flow diagram illustrating an example process 500 for using a CDN to distribute forwarded bids within a digital advertising ecosystem, in accordance with embodiments of the present disclosure.

More specifically, the CDN 510 may be used to filter impression opportunities presented by a DSP to an advertiser for real-time bidding (for example, when there are no pre-cached bids or ad campaigns established with the DSP).

At circle 1, an advertiser 530 may subscribe to bid opportunities with the CDN 510.

At circle 2, the DSP 535 (or any other suitable supply source) may publish filtered bid opportunities to the CDN 510 (for example, rather than informing the advertiser 530 directly). In some embodiments, these bid opportunities may be in real-time. The CDN 510 then forwards these published bid opportunities to the appropriate advertisers based on their subscriptions (for example, established at circle 1). Thus, the CDN 510 may be used to filter bid opportunities to be presented to different advertisers. For instance, the CDN 510 may determine that only a subset of the published bid opportunities from the DSP 535 are relevant to the advertiser 530 and should be presented to the advertiser 530 based on the advertiser's subscription.

At circle 3, the advertiser 530 can return bid responses to the bid opportunities that it received. Alternatively, the advertiser 530 may provide its bidding algorithm to the CDN 510 (for example, at an earlier point in time), and the CDN 510 may store and execute the bidding algorithm on behalf of the advertiser 530.

At circle 4, the DSP 535 will receive bids back from the advertiser 530 or the CDN 510, if the CDN 510 is executing a bidding algorithm on behalf of the advertiser 530.

Finally, the CDN 510 may store bid win/loss data, which can be retrievable by the advertiser 530 and the DSP 535.

It should be noted that most of the example process 500 shown can occur within a fraction of a second, or may be designed to occur within a fraction of the second. For instance, the actions associated with circles 2-4 (for example, publishing, filtering, and responding to bid opportunities) may be performed within seconds. Thus, speed and efficiency may be of the essence and the integration of the CDN 510 in the manner shown in the example process 500 may provide that necessary speed and efficiency. In particular, if the CDN 510 is fast enough, it eliminates the need for co-locating servers/building infrastructure and allows the CDN 510 to distribute forwarded bids.

Figure 9A:
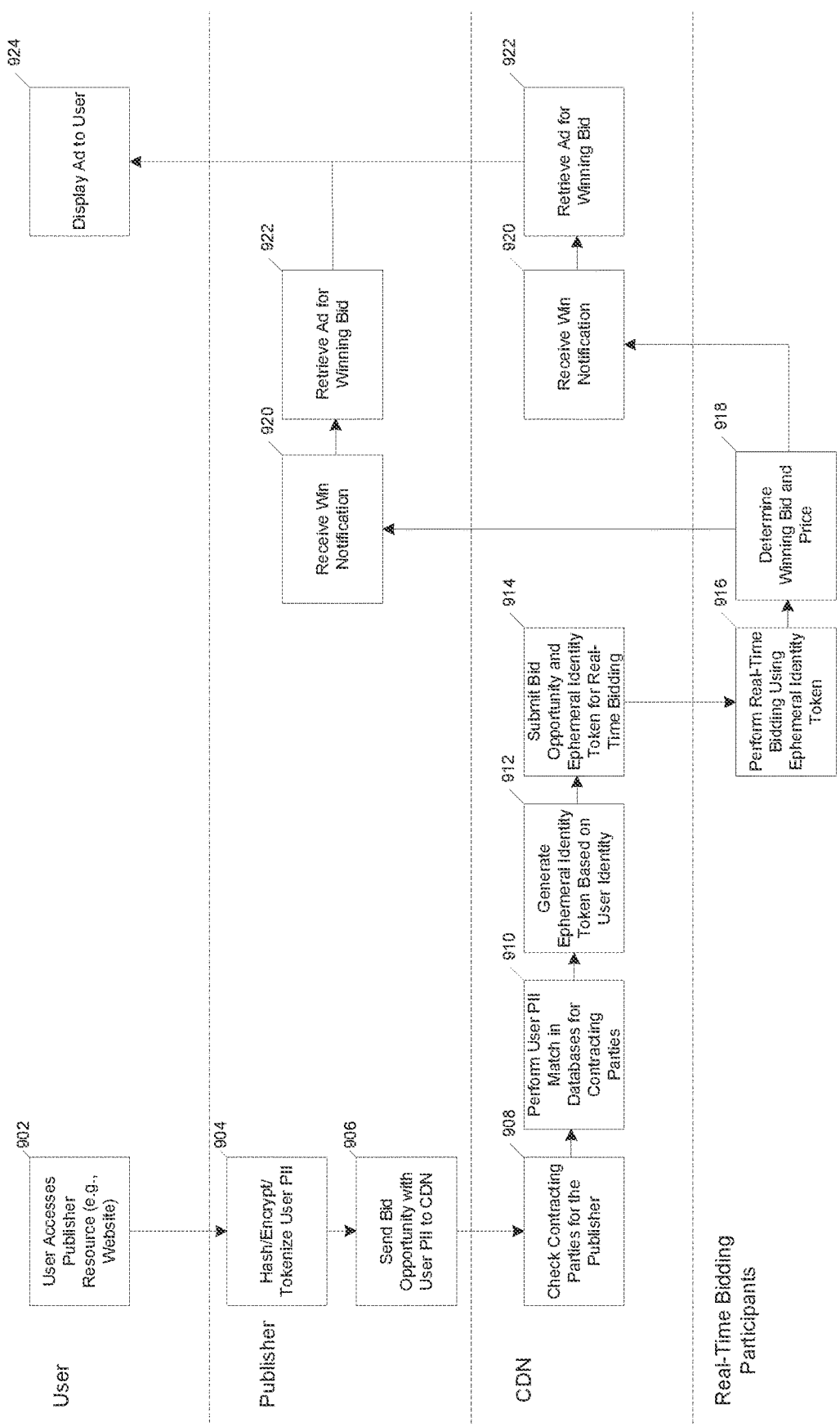
FIG. 9A is a block diagram illustrating an example workflow between participants of a digital advertising ecosystem, according to some embodiments of the present disclosure.

FIG. 9A is a block diagram illustrating an example workflow between participants of a digital advertising ecosystem, according to some embodiments of the present disclosure.

At block 902, a user may access a resource of a publisher using a user device. The user may provide, or may have previously provided, personally identifiable information (PII) to the publisher, such as if the user has an account established with the publisher.

In some cases, the publisher may provide content to the user along with an advertisement that is selected through real-time bidding. In order to do so, at block 904, the publisher may hash, encrypt, or tokenize PII associated with the user. Then, at block 906, the publisher may send a bid opportunity with the hashed, encrypted, or tokenized user PII to the CDN.

When the CDN receives the bid opportunity with the hashed, encrypted, or tokenized user PII, the CDN may look-up or decrypt the hashed, encrypted, or tokenized user PII in order to obtain the user PII in plaintext. At block 908, the CDN may check the contracting parties associated with the specific publisher that sent the bid opportunity. The CDN may maintain a database of publishers and any contracting parties associated with each publisher, and the CDN may reference this database. Contracting parties associated with a publisher may include parties that the publisher has allowed to participate in the real-time bidding process for a bid opportunity provided by the publisher.

At block 910, the CDN may take the plaintext user PII obtained from the bid opportunity and match it to any user PII in the database associated with each contracting party. The CDN may maintain a database for each contracting party that contains the PII (for various users) which have been collected by that contracting party. The CDN may collect, from across these contracting party databases, all the user PII and corresponding metadata that matches to the plaintext user PII and belongs to the user identity.

At block 912, the CDN may generate an ephemeral identity token based on the user identity and metadata, and at block 914, the CDN may submit the bid opportunity (provided by the publisher at block 906) and the ephemeral identity token to the participants of the real-time bidding.

At block 916, the real-time bidding participants may perform real-time bidding using the ephemeral identity token generated by the CDN. At block 918, the real-time bidding participants may determine a winning bid and price and provide that information in a win notification to either the CDN and/or the publisher. At block 920, the CDN and/or the publisher may receive the win notification, and at block 922, the CDN and/or the publisher (depending on where the ad is stored) may retrieve the ad associated with the winning bid and provide it to the user device, which will display the ad to the user at block 918.

Figure 9B:
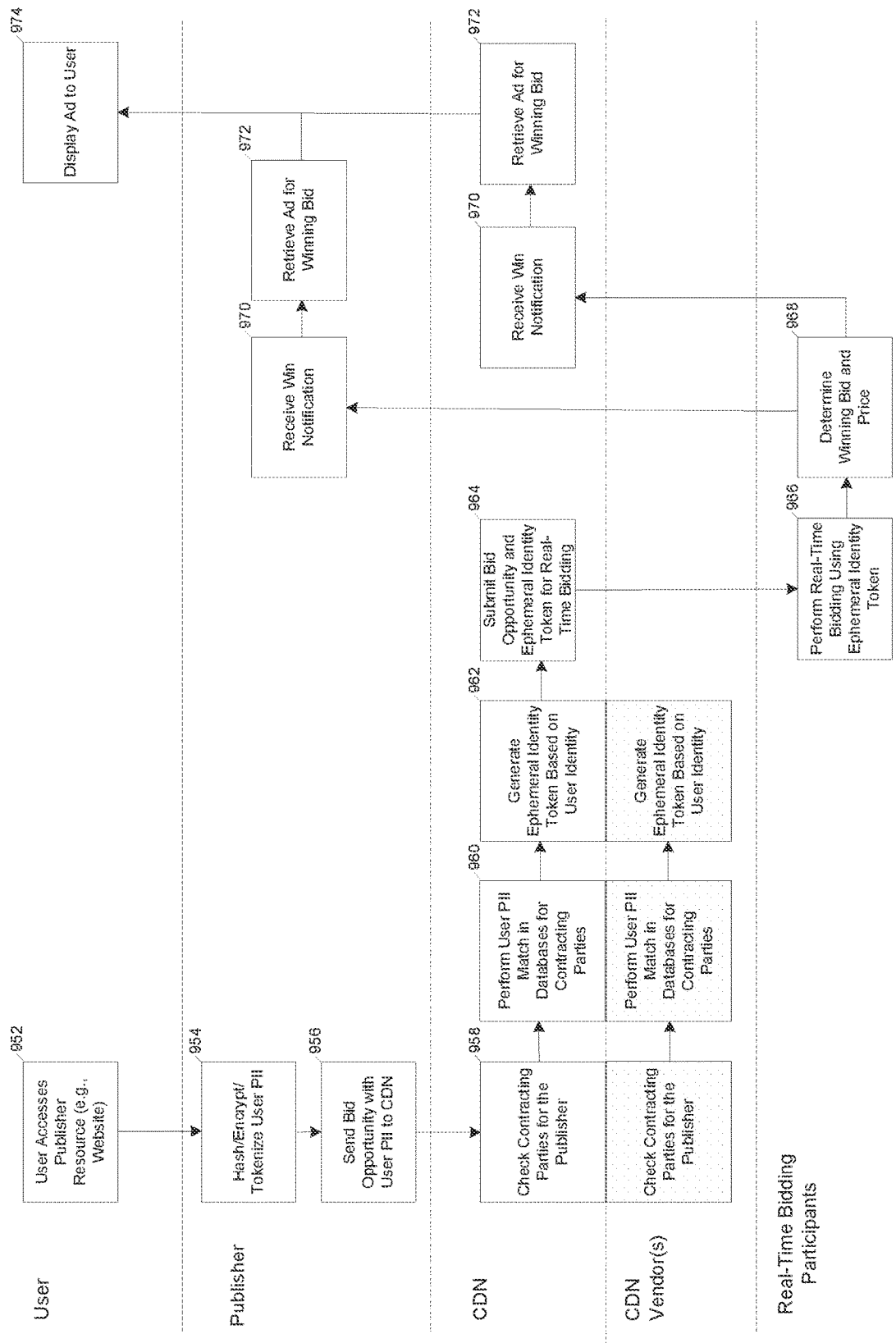
FIG. 9B is a block diagram illustrating an example workflow between participants of a digital advertising ecosystem, according to some embodiments of the present disclosure.

FIG. 9B is a block diagram illustrating an example workflow between participants of a digital advertising ecosystem, according to some embodiments of the present disclosure. The workflow illustrated in FIG. 9B is similar to the workflow illustrated in FIG. 9A, but there are some differences introduced by the addition of one or more CDN vendors into the workflow. In particular, there may be one or more CDN vendors that may be configured to perform functions or processes in place of the CDN, such as the functions or processes associated with blocks 958, 960, or 962. It should also be noted that some of these functions and processes may be performed by different CDN vendors. For example, blocks 958, 960, and 962 may be performed by three respective CDN vendors.

At block 952, a user may access a resource of a publisher using a user device. The user may provide, or may have previously provided, personally identifiable information (PII) to the publisher, such as if the user has an account established with the publisher.

In some cases, the publisher may provide content to the user along with an advertisement that is selected through real-time bidding. In order to do so, at block 954, the publisher may hash, encrypt, or tokenize PII associated with the user. Then, at block 956, the publisher may send a bid opportunity with the hashed, encrypted, or tokenized user PII to the CDN. When the CDN receives the bid opportunity with the hashed, encrypted, or tokenized user PII, the CDN may look-up or decrypt the hashed, encrypted, or tokenized user PII in order to obtain the user PII in plaintext.

At block 958, either the CDN or a CDN vendor may check the contracting parties associated with the specific publisher that sent the bid opportunity.

In the first case where the CDN checks the contracting parties, the CDN may maintain and reference a database of publishers and any contracting parties associated with each publisher. The contracting parties associated with a publisher may include parties that the publisher has allowed to participate in the real-time bidding process for a bid opportunity provided by the publisher.

In the second case where a CDN vendor checks the contracting parties, the CDN vendor may maintain the database of publishers and any contracting parties associated with each publisher. Prior to block 958, the CDN may inform the CDN vendor of the specific publisher that sent the bid opportunity, which the CDN vendor can then use to reference its database to determine the contracting parties associated with that publisher.

At block 960, either the CDN or a CDN vendor may take the plaintext user PII obtained from the bid opportunity and match it against user PII in the database associated with each contracting party.

In the first case where the CDN performs the matching, the CDN may maintain a database for each contracting party that will contain PII (for various users) collected by the respective contracting party. The CDN may collect, from across these contracting party databases, all the user PII and corresponding metadata that matches to the plaintext user PII and belongs to the user identity. If a CDN vendor had performed block 958, then the CDN vendor may first supply a list of contracting parties to the CDN so that the CDN knows which contracting party databases to search for the matching process.

In the second case where the CDN vendor performs the matching, the CDN vendor may maintain the database for each contracting party, which contain PII (for variou s users) collected by the respective contracting party. The CDN vendor may collect all the user PII and metadata from across these contracting party databases that correspond to the plaintext user PII and belong to the user identity. If the CDN or a different CDN vendor had performed block 958, then this CDN vendor would first have to obtain the list of contracting parties from the entity that performed block 958 in order for this CDN vendor to know which contracting party databases to search for the matching process.

At block 962, either the CDN or a CDN vendor may generate an ephemeral identity token based on the user identity and metadata. This ephemeral identity token may contain available information about segment membership/association for the user identity. For example, the ephemeral identity token could indicate that the user identity has a preference for brand 'X' diapers.

In the first case where the CDN generates the ephemeral identity token, if a CDN vendor had performed block 960, then that CDN vendor may first supply matching user PII and metadata to the CDN for use in generating the ephemeral identity token at block 962. Otherwise, if the CDN already has matching user PII and metadata on-hand, the CDN can directly proceed to generating the ephemeral identity token.

In the second case where a CDN vendor generates the ephemeral identity token, if the CDN or a different CDN vendor had performed block 960, then the CDN vendor may first have to obtain the matching user PII and metadata in order to use that information to generate the ephemeral identity token at block 962. Otherwise, if the CDN vendor already has matching user PII and metadata on-hand (e.g., the CDN vendor also performed the matching at block 960), the CDN vendor can directly proceed to generating the ephemeral identity token.

At block 964, the CDN may submit the bid opportunity (provided by the publisher at block 956) and the ephemeral identity token to the participants of the real-time bidding process. If a CDN vendor generated the ephemeral identity token at block 962, the CDN may first receive the ephemeral identity token from the CDN vendor.

At block 966, the real-time bidding participants may perform real-time bidding using the ephemeral identity token provided by the CDN. At block 968, the real-time bidding participants may determine a winning bid and price and provide that information in a win notification to either the CDN and/or the publisher. At block 970, the CDN and/or the publisher may receive the win notification, and at block 972, the CDN and/or the publisher (depending on where the ad is stored) may retrieve the ad associated with the winning bid and provide it to the user device, which will display the ad to the user at block 974.

Figure 10A:
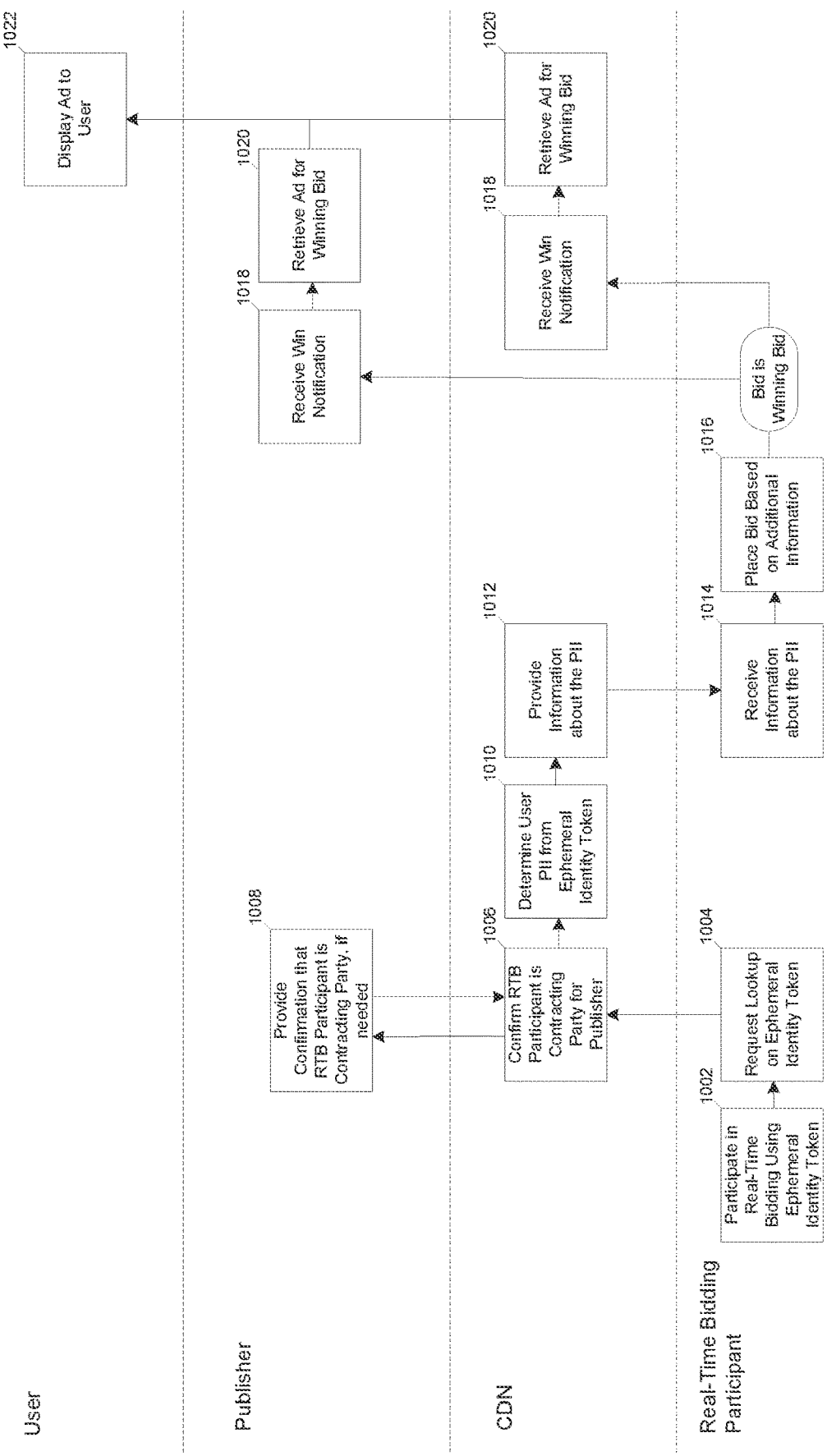
FIG. 10A is a block diagram illustrating an example workflow between participants of a digital advertising ecosystem, according to some embodiments of the present disclosure.

FIG. 10A is a block diagram illustrating an example workflow between participants of a digital advertising ecosystem, according to some embodiments of the present disclosure. In some cases, the workflow illustrated in FIG. 10A may be performed in conjunction with the workflow illustrated in FIG. 9A. For instance, FIG. 10A illustrates an example workflow associated with a real-time bidding process that may fit with blocks 916, 918, 920, 922, and 924 of FIG. 9A after the real-time bidding participant(s) have already received a bid opportunity and ephemeral identity token from the CDN.

At block 1002, a real-time bidding participant may participate in the real-time bidding using an ephemeral identity token received from the CDN and corresponding to the bid opportunity. However, the real-time bidding participant may require more information during this real-time bidding process. Accordingly, at block 1004, the real-time bidding participant may request a lookup on the ephemeral identity token.

At block 1006, the CDN may confirm that the real-time bidding participant is a contracting party for the publisher that provided the bid opportunity, such that the real-time bidding participant would have authorization to obtain additional information. In some cases, the CDN may not have enough information on-hand to make this determination, and in such cases, the CDN may request that the publisher provide confirmation that the real-time bidding participant is a contracting party at block 1008.

After confirming that the real-time bidding participant is a contracting party, at block 1010, the CDN may determine user PII from the ephemeral identity token. However, the CDN may not necessarily pass PII directly back to the real-time bidding participant in all cases.

In the cases where the CDN is passing PII back to the real-time bidding participant, the CDN may first repackage the PII for safe delivery by hashing or encrypting the PII. Thus, at block 1012, the CDN would first generate and package this information about the PII (e.g., hash/encrypt the PII) and provide it back to the real-time bidding participant.

Alternatively, in the cases where the CDN is not providing PII to the real-time bidding participant, the CDN may determine if the user associated with the ephemeral identity token belongs to a segment of users that is immediately relevant to the real-time bidding participant requesting the lookup. For instance, the CDN may determine if it should package relevant information, such as some kind of identifier (e.g., a user identifier) that has varying uses depending on the permissions granted to the real-time bidding participant. As a specific example, the CDN may package user segment membership back into a new token that the real-time bidding participant can read for the purpose of deciding whether to bid on the bid opportunity. This may be useful, for example, if the publisher wishes to hide PII from real-time bidding participants that are supply-side platforms (SSP) and/or demand-side platforms (DSP), and the publisher may allow a SSP/DSP to only receive a segment identifier signal (e.g., "seg ID 123" associated with advertiser 'ABC' in-store purchasers) with the bid opportunity. Then, at block 1012, the CDN can hash or encrypt this information associated with the user PII and provide it back to the real-time bidding participant.

At block 1014, the real-time bidding participant can receive the hashed or encrypted information about the PII from the CDN. The real-time bidding participant can extract this additional information and use it for decision making in the bidding process, and at block 1016, the real-time bidding participant can use the additional information to place a bid. If the bid is the winning bid, then at block 1018, either the CDN and/or the publisher may receive a win notification with the winning bid and price. At block 1020, the CDN and/or the publisher (depending on where the ad associated with the winning bid is stored) may retrieve the ad associated with the winning bid and provide it to the user device, which will display the ad to the user at block 1022.

Figure 10B:
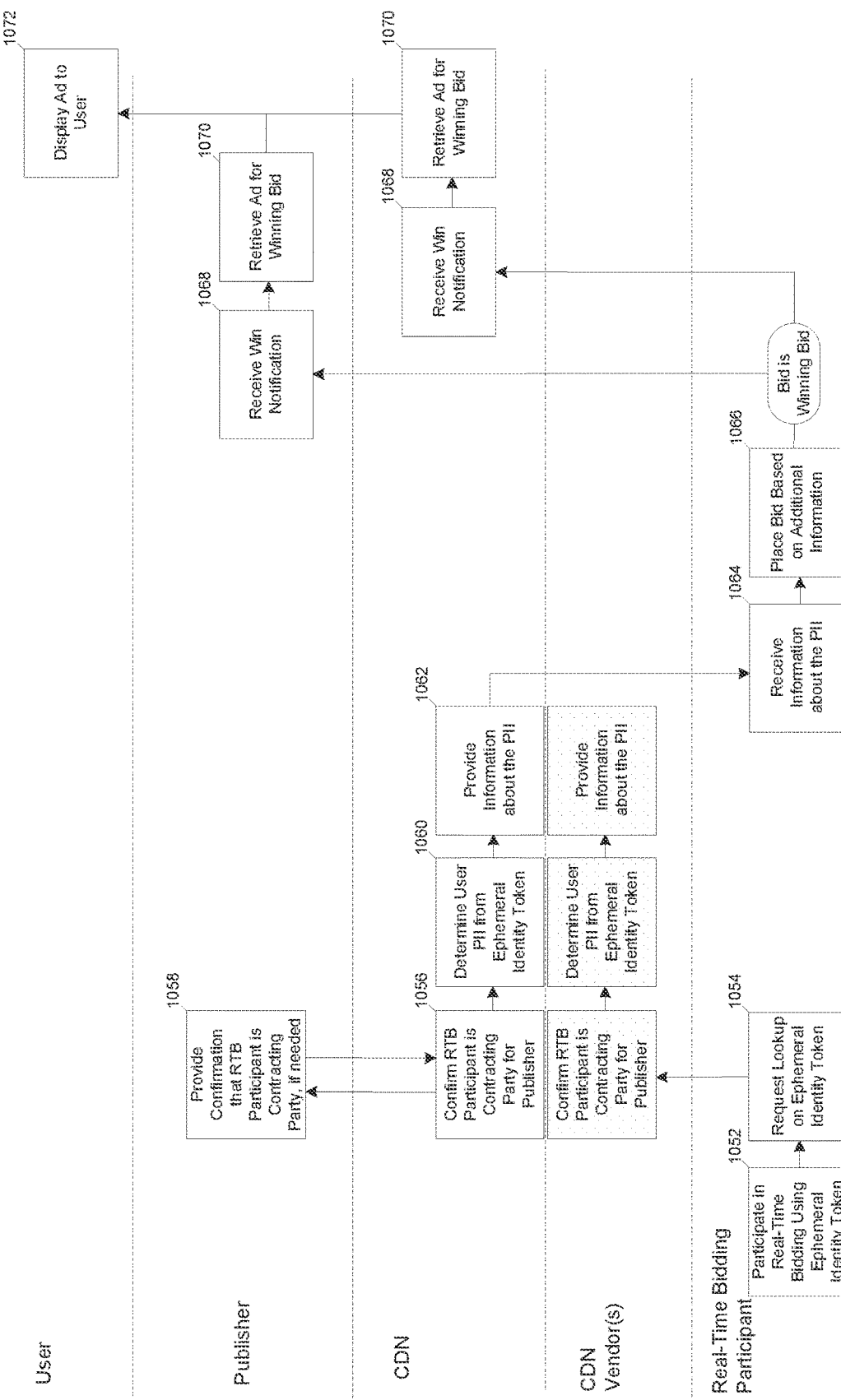
FIG. 10B is a block diagram illustrating an example workflow between participants of a digital advertising ecosystem, according to some embodiments of the present disclosure.

FIG. 10B is a block diagram illustrating an example workflow between participants of a digital advertising ecosystem, according to some embodiments of the present disclosure. The workflow illustrated in FIG. 10B is similar to the workflow illustrated in FIG. 10A, but there are some differences introduced by the addition of one or more CDN vendors into the workflow. In particular, there may be one or more CDN vendors that may be configured to perform functions or processes in place of the CDN, such as the functions or processes associated with blocks 1056, 1060, or 1062. It should also be noted that some of these functions and processes may be performed by different CDN vendors. For example, blocks 1056, 1060, or 1062 may be performed by three respective CDN vendors.

At block 1052, a real-time bidding participant may participate in the real-time bidding using an ephemeral identity token received from the CDN and corresponding to the bid opportunity. However, the real-time bidding participant may require more information during this real-time bidding process. Accordingly, at block 1054, the real-time bidding participant may request a lookup on the ephemeral identity token.

At block 1056, either the CDN or a CDN vendor may confirm that the real-time bidding participant is a contracting party for the publisher that provided the bid opportunity, such that the real-time bidding participant would have authorization to obtain additional information. In some embodiments, the CDN or the CDN vendor may have one or more databases for managing entity permissions in the chain (e.g., does a particular DSP have the right to get information about a particular user?), which can be referenced to make this determination. In some cases, the CDN or the CDN vendor may not have enough information on-hand to make this determination, and in such cases, it may request that the publisher provide confirmation that the real-time bidding participant is a contracting party at block 1058. If the real-time bidding participant is a contracting party for the publisher, then the workflow can continue.

At block 1060, either the CDN or a CDN vendor may determine user PII from the ephemeral identity token. In some embodiments, the CDN or the CDN vendor may have one or more databases containing PII, segment membership, and any other relevant data for users. The CDN or CDN vendor may be able to reference these databases in order to find any available data (such as PII) corresponding to the particular user identified from the ephemeral identity token. However, the CDN may not necessarily pass PII directly back to the real-time bidding participant in all cases.

In the cases where the CDN is passing PII back to the real-time bidding participant, the CDN or the CDN vendor may first repackage the PII for safe delivery by hashing or encrypting the PII. At block 1062, the CDN may generate and package this information about the PII (e.g., hash/encrypt the PII) and then provide it to the real-time bidding participant. Alternatively, at block 1062, the CDN vendor could generate and package this information about the PII and then deliver it to the CDN, which will then forward the information to the real-time bidding participant.

In the cases where the CDN is not providing PII to the real-time bidding participant, the CDN or the CDN vendor may determine if the user associated with the ephemeral identity token belongs to a segment of users that is immediately relevant to the real-time bidding participant requesting the lookup. For instance, the CDN or the CDN vendor may determine if it should package relevant information, such as some kind of identifier (e.g., a user identifier) that has varying uses depending on the permissions granted to the real-time bidding participant. As a specific example, the CDN or the CDN vendor may package user segment membership back into a new token that the real-time bidding participant can read for the purpose of deciding whether to bid on the bid opportunity. This may be useful, for example, if the publisher wishes to hide PII from real-time bidding participants that are supply-side platforms (SSP) and/or demand-side platforms (DSP), and the publisher may allow a SSP/DSP to only receive a segment identifier signal (e.g., "seg ID 123" associated with advertiser 'ABC' in-store purchasers) with the bid opportunity. At block 1062, the CDN can hash or encrypt this information associated with the user PII and provide it back to the real-time bidding participant. Alternatively, at block 1062, the CDN vendor could hash or encrypt this information associated with the user PII and then deliver it to the CDN, which will then forward the information to the real-time bidding participant.

At block 1064, the real-time bidding participant can receive the hashed or encrypted information about the PII from the CDN. The real-time bidding participant can extract this additional information and use it for decision making in the bidding process, and at block 1066, the real-time bidding participant can use the additional information to place a bid. If the bid is the winning bid, then at block 1068, either the CDN and/or the publisher may receive a win notification with the winning bid and price. At block 1070, the CDN and/or the publisher (depending on where the ad associated with the winning bid is stored) may retrieve the ad associated with the winning bid and provide it to the user device, which will display the ad to the user at block 1072.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (for example, a computer readable storage medium) of the executing computing device, for execution by the computing device. The computer readable program instructions may execute entirely on a user's computer (for example, the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (for example, a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (for example, application-specific integrated circuits (ASICs)), programmable processors (for example, field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (for example, Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
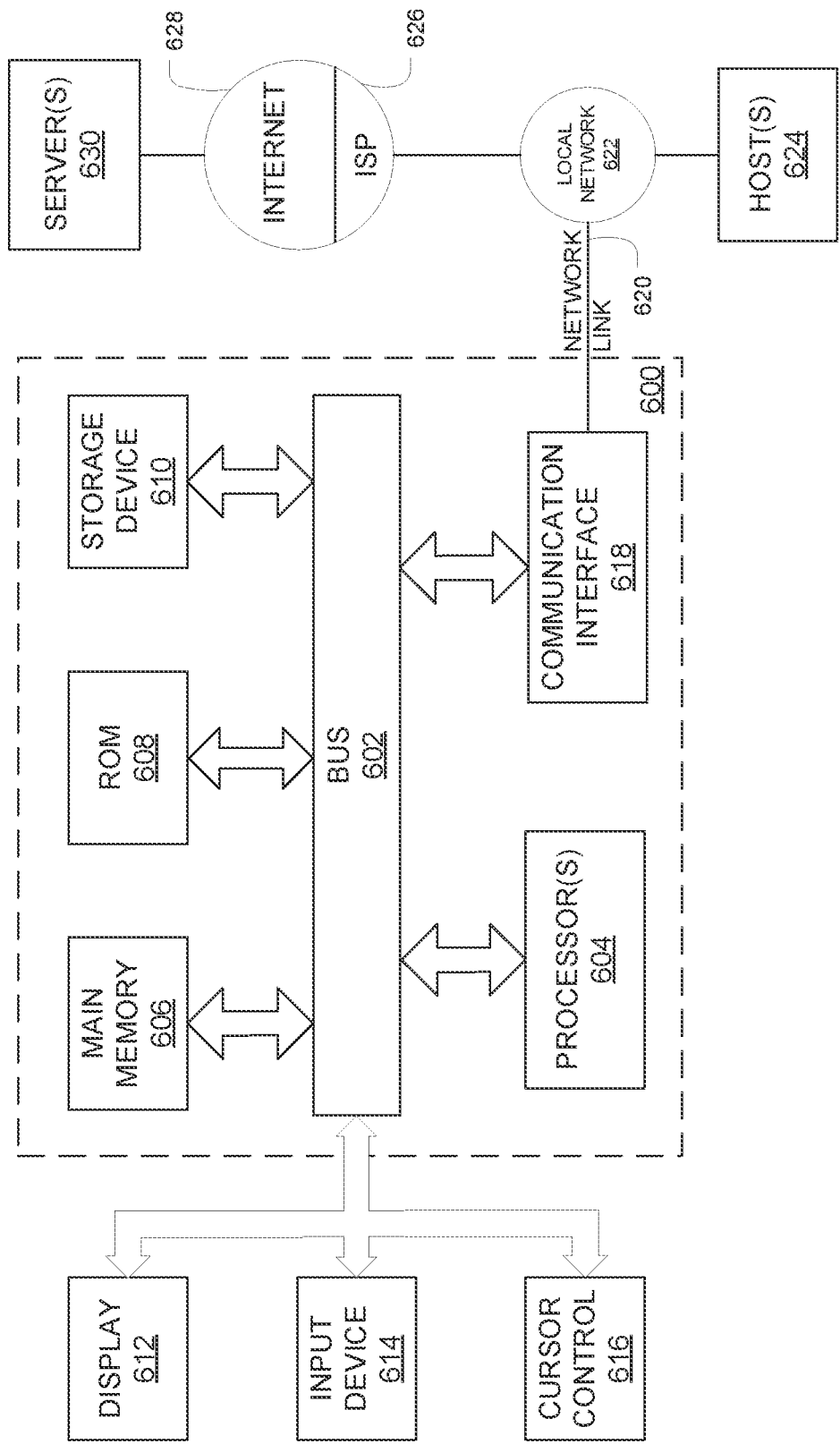
FIG. 6 illustrates a computer system with which certain methods discussed herein may be implemented, in accordance with some embodiments of the present disclosure.

For example, FIG. 6 is a block diagram that illustrates a computer system 600 upon which various embodiments may be implemented. Computer system 600 includes a bus 602 or other communication mechanism for communicating information, and a hardware processor, or multiple processors, 604 coupled with bus 602 for processing information. Hardware processor(s) 604 may be, for example, one or more general purpose microprocessors.

Computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

Computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Computing system 600 may include a user interface module to implement a GUI that may be stored in a mass storage device as computer executable program instructions that are executed by the computing device(s). Computer system 600 may further, as described below, implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more computer readable program instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

Various forms of computer readable storage media may be involved in carrying one or more sequences of one or more computer readable program instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (for example, running on the user's computing system). Alternatively, data (for example, user interface data) necessary for generating the user interface may be provided by the server computing system to the browser, where the user interface may be generated (for example, the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Figure 7:
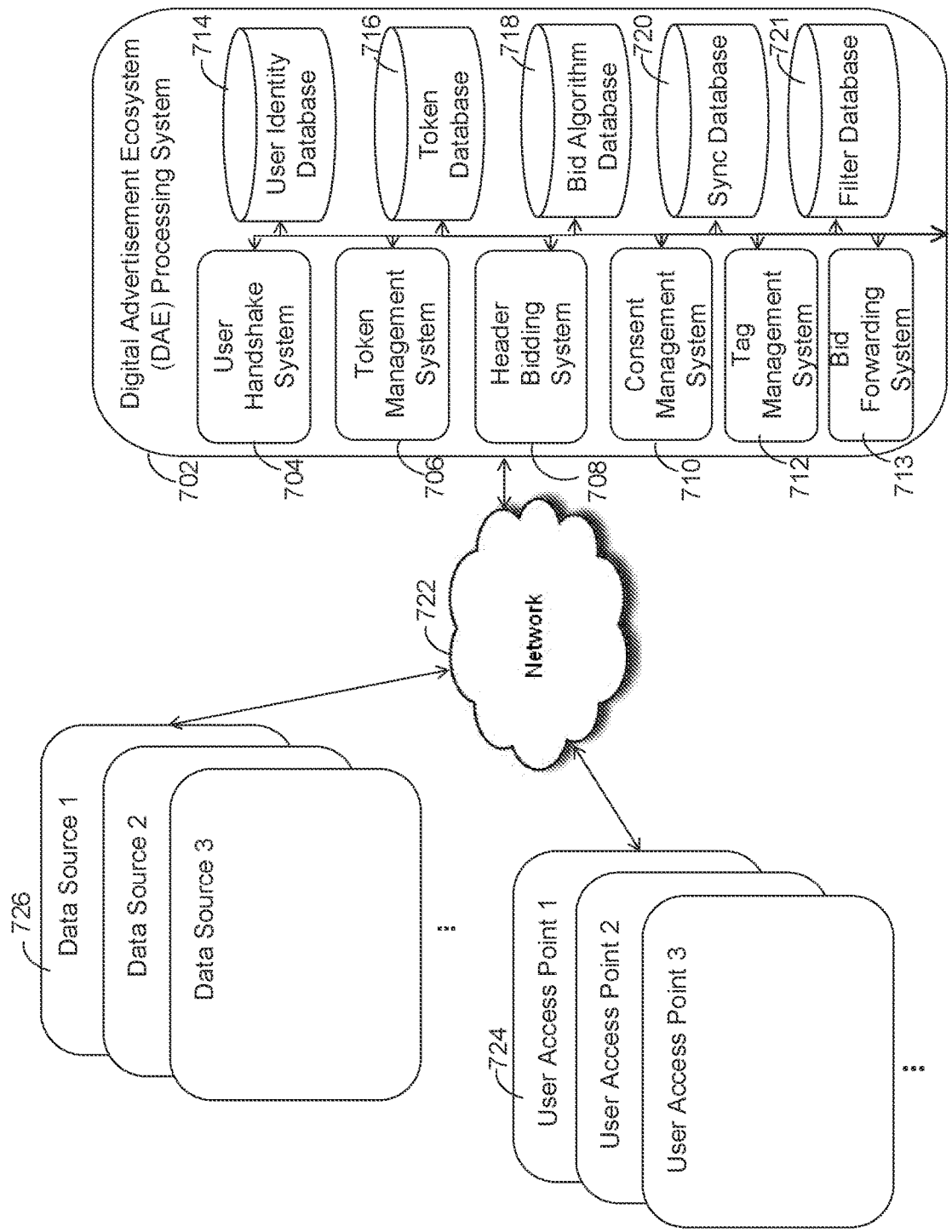
FIG. 7 is a schematic diagram illustrating a content delivery network according to some embodiments.

FIG. 7 is a schematic diagram illustrating a content delivery network according to some embodiments. In some embodiments, a content delivery network may be configured to include a digital advertisement ecosystem (DAE) processing system 702. The DAE processing system can be comprised of a user handshake system 704, a token management system 706, a header bidding system 708, a consent management system 710, a tag management system 712, a bid forwarding system 713, an user identity database 714, a token database 716, a bid algorithm database 718, a sync database 720, and/or a filter database 721. The DAE processing system 702 can be connected to a network 722. The network 722 can be configured to connect the DAE processing system 702 to one or more user access points 724 and/or more external data sources 726.

In some embodiments, the user handshake system 704 may be able to extract user data (for example, behavior, preferences, and so forth) from received information and determine a user identity associated with that user data (for example, based on a deterministic identifier). Unique user identities and their associated user data that have been collected over time may be stored in the user identity database 714. The user handshake system 704 may also be able to receive a deterministic identifier, determine if a user identity exists for that deterministic identifier within the user identity database 714, and retrieve stored user data tied to that user identity that is stored in the user identity database 714. For instance, the user handshake system 704 may receive a first deterministic identifier and determine that it matches an existing second deterministic identifier stored in the user identity database 714 before retrieving any user data that has been indexed to the second deterministic identifier within the user identity database 714.

In some embodiments, the token management system 706 may be able to generate electronic tokens based on user data. The token management system 706 may be capable of encrypting and decrypting the token. The token management system 706 may also keep track of which impression opportunity corresponds to which token, and also which entities have received which tokens. The token management system 706 may store copies of generated tokens in the token database 716.

In some embodiments, the header bidding system 708 may be able to perform header bidding according to the methods described herein. The header bidding system 708 may be configured to send out a plurality of bid requests to a plurality of entities and receive bid responses from the plurality of entities at roughly the same time. In some embodiments, the consent management system 710 may be able to obtain user consent needed for any of the methods described herein, such as user consent for off-loading header bidding onto the DAE processing system 702. In some embodiments, there may be a bid algorithm database 718 storing bid algorithms or defined ad campaigns for various entities, to enable the DAE processing system 702 to bid on their behalf.

In some embodiments, the tag management system 712 may manage tracking tags for sync pixels and site tracking for users, including CDN-owned master-tracking tags. In some embodiments, sync pixels (or any other user ID tracking technology) for numerous entities can be stored and hosted in a sync database 720. The tag management system 712 may manage master-tracking tags and be able to determine which sync pixels stored in the sync database 720 correspond to a particular master-tracking tag. In some embodiments, the tag management system 712 may be able to initiate the retrieval of one or more of the sync pixels from the sync database 720 based on a particular master-tracking tag.

In some embodiments, the bid forwarding system 713 may manage the distributions of forwarded bids based on filters defined in the filter database 721. More specifically, each entity could define one or more filters for bid requests (for example, for impression opportunities) they would like to receive. The bid forwarding system 713 may be able to receive a bid request and apply the filters in the filter database 721 for all the various entities, in order to determine the subset of entities with filters configured to receive that bid request. The bid forwarding system 713 can then send the bid request to that subset of entities configured to receive it.

Figure 8:
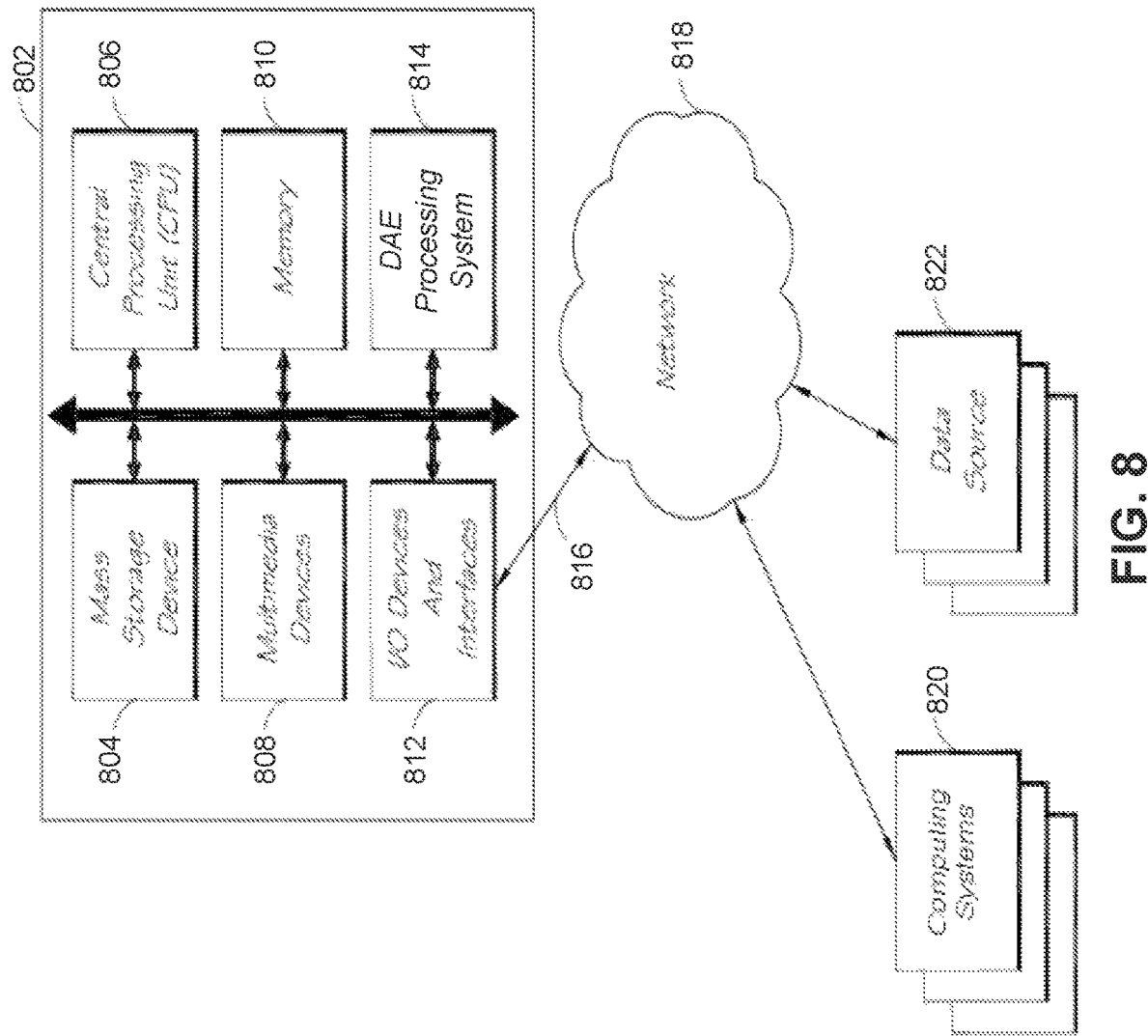
FIG. 8 illustrates a computer system with which certain methods discussed herein may be implemented.

FIG. 8 illustrates a computer system with which certain methods discussed herein may be implemented. The example computer system 802 is in communication with one or more computing systems 820 and/or one or more data sources 822 via one or more networks 818. While FIG. 8 illustrates an embodiment of a computing system 802, it is recognized that the functionality provided for in the components and systems of computer system 802 can be combined into fewer components and systems, or further separated into additional components and systems.

The computer system 802 can comprise a digital advertisement ecosystem (DAE) processing system 814 that carries out the functions, methods, acts, and/or processes described herein. The DAE processing system 814 may be executed on the computer system 802 by a central processing unit 806 discussed further below.

In general the word "system," as used herein, refers to logic embodied in hardware or firmware or to a collection of software instructions, having entry and exit points. Systems are written in a program language, such as JAVA, C, or C++, or the like. Software systems can be compiled or linked into an executable program, installed in a dynamic link library, or can be written in an interpreted language such as BASIC, PERL, LAU, PHP or Python and any such languages. Software systems can be called from other systems or from themselves, and/or can be invoked in response to detected events or interruptions. Systems implemented in hardware include connected logic units such as gates and flip-flops, and/or can comprise programmable units, such as programmable gate arrays or processors.

Generally, the systems described herein refer to logical systems that can be combined with other systems or divided into sub-systems despite their physical organization or storage. The systems are executed by one or more computing systems, and can be stored on or within any suitable computer readable medium, or implemented in-whole or in-part within special designed hardware or firmware. Not all calculations, analysis, and/or optimization require the use of computer systems, though any of the above-described methods, calculations, processes, or analyses can be facilitated through the use of computers. Further, in some embodiments, process blocks described herein can be altered, rearranged, combined, and/or omitted.

The computer system 802 includes one or more processing units (CPU) 806, which can comprise a microprocessor. The computer system 802 further includes a physical memory 810, such as random access memory (RAM) for temporary storage of information, a read only memory (ROM) for permanent storage of information, and a mass storage device 804, such as a backing store, hard drive, rotating magnetic disks, solid state disks (SSD), flash memory, phase-change memory (PCM), 3D XPoint memory, diskette, or optical media storage device. Alternatively, the mass storage device can be implemented in an array of servers. Typically, the components of the computer system 802 are connected to the computer using a standards based bus system. The bus system can be implemented using various protocols, such as Peripheral Component Interconnect (PCI), Micro Channel, SCSI, Industrial Standard Architecture (ISA) and Extended ISA (EISA) architectures.

The computer system 802 includes one or more input/output (I/O) devices and interfaces 812, such as a keyboard, mouse, touch pad, and printer. The I/O devices and interfaces 812 can comprise one or more display devices, such as a monitor, that allows the visual presentation of data to a user. More particularly, a display device provides for the presentation of GUIs as application software data, and multi-media presentations, for example. The I/O devices and interfaces 812 can also provide a communications interface to various external devices. The computer system 802 can comprise one or more multi-media devices 808, such as speakers, video cards, graphics accelerators, and microphones, for example.

FIG. 8 is a block diagram depicting an embodiment of a computer hardware system configured to run software for implementing one or more embodiments of a DAE processing system. The computer system 802 can run on a variety of computing devices, such as a server, a Windows server, a Structure Query Language server, a Unix Server, a personal computer, a laptop computer, and so forth. In other embodiments, the computer system 802 can run on a cluster computer system, a mainframe computer system and/or other computing system suitable for controlling and/or communicating with large databases, performing high volume transaction processing, and generating reports from large databases. The computing system 302 is generally controlled and coordinated by operating system software, such as z/OS, Windows, Linux, UNIX, BSD, PHP, SunOS, Solaris, MacOS, ICloud services or other compatible operating systems, including proprietary operating systems. Operating systems control and schedule computer processes for execution, perform memory management, provide file system, networking, and I/O services, and provide a user interface, such as a graphical user interface (GUI), among other things.

The computer system 802 illustrated in FIG. 8 is coupled to a network 818, such as a LAN, WAN, or the Internet via a communication link 816 (wired, wireless, or a combination thereof). Network 818 communicates with various computing devices and/or other electronic devices. Network 818 is communicating with one or more computing systems 820 and one or more data sources 822. The computer system 802 can comprise a feature extraction system 814 can access or can be accessed by computing systems 820 and/or data sources 822 through a web-enabled user access point. Connections can be a direct physical connection, a virtual connection, and other connection type. The web-enabled user access point can comprise a browser system that uses text, graphics, audio, video, and other media to present data and to allow interaction with data via the network 818.

The output system can be implemented as a combination of an all-points addressable display such as a cathode ray tube (CRT), a liquid crystal display (LCD), a plasma display, or other types and/or combinations of displays. The output system can be implemented to communicate with input devices and/or interfaces 812 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output system can communicate with a set of input and output devices to receive signals from the user.

The computing system 802 can comprise one or more internal and/or external data sources (for example, data sources 822). In some embodiments, one or more of the data repositories and the data sources described above can be implemented using a relational database, such as DB2, Sybase, Oracle, CodeBase, and Microsoft® SQL Server as well as other types of databases such as a flat-file database, an entity relationship database, and object-oriented database, and/or a record-based database.

The computer system 802 can also access one or more data sources 822. The data sources 822 can be stored in a database or data repository. The computer system 802 can access the one or more data sources 822 through a network 818 or can directly access the database or data repository through I/O devices and interfaces 812. The data repository storing the one or more data sources 822 can reside within the computer system 802.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computing system for a content delivery network enabling identity escrow and preventing user-based data leakage and cookie-mapping, the computing system comprising:
   a computer readable storage medium having program instructions embodied therewith; and
   one or more processors configured to execute the program instructions to cause the computer system to perform the processes of:
      initiating delivery of content to a computing system of a user in response to a request for the content by the computing system of the user;
      storing a first deterministic identifier associated with the user;
      storing user-specific preference information associated with the user based on the first deterministic identifier associated with the user;
      receiving, from a publisher, a second deterministic identifier, wherein the publisher does not have access to the first deterministic identifier or the user-specific preference information;
      determining if the second deterministic identifier is associated with the user associated with the first deterministic identifier;
      retrieving the stored user-specific preference information associated with the user based on a determination that the second deterministic identifier and the first deterministic identifier are both associated with the user;
      generating an encrypted token based on the retrieved user-specific preference information associated with the user, wherein the generated encrypted token does not comprise any personally identifiable information for the user;
      determining a level of permission associated with one or more of a plurality of demand side platforms to possess a subset of the personally identifiable information for the user, wherein the subset of the personally identifiable information comprises data owned by the one or more of the plurality of demand side platforms or data enabled to be shared to one or more demand side platforms;
      if at least one of the plurality of demand side platforms is determined to be associated with a level of permission to possess the subset of the personally identifiable information:
         retrieving the subset of the personally identifiable information for the user based at least in part on the determined level of permission associated with the at least one of the plurality of demand side platforms;
         encrypting the subset of the personally identifiable information for the user; and
         adding the encrypted subset of the personally identifiable information to the encrypted token;
      transmitting the encrypted token to the publisher for submission alongside a bid request to a demand-side platform for real-time bidding,
      wherein the encrypted subset of the personally identifiable information of the encrypted token is configured to be inaccessible to any of the plurality of demand side platforms which has not be been determined to possess or be authorized to possess the subset of the personally identifiable information; and
      delivering to the computing system of the user the content and an ad impression.

2. The computing system of claim 1, wherein the real-time bidding is processed outside of a header of a browser of the computing system of the user.

3. The computing system of claim 1, wherein the real-time bidding is processed within a header of a browser of the computing system of the user.

4. The computing system of claim 1, wherein the computing system is a proxy server of the content delivery network.

5. The computing system of claim 1, wherein the user-specific preference information comprises market segment membership information associated with the user.

6. The computing system of claim 1, wherein the user-specific preference information comprises purchasing preferences associated with the user.

7. The computing system of claim 1, wherein the first deterministic identifier is an email address for the user.

8. The computing system of claim 1, wherein the second deterministic identifier received from the publisher is associated with an impression opportunity offered by the publisher.

9. The computing system of claim 1, wherein the program instructions when executed further cause the system to perform the step of transmitting the encrypted token to a supply-side platform.

10. The computing system of claim 1, wherein the program instructions when executed further cause the system to perform the steps of:
   receiving, from the demand-side platform, a request for the user-specific preference information associated with the user that is included in the encrypted token; and
   providing the demand-side platform the user-specific preference information associated with the user by decrypting the encrypted token.

11. The computing system of claim 1, wherein the program instructions when executed further cause the system to perform the steps of:
   receiving, from the demand-side platform, a request for the user-specific preference information associated with the user that is included in the encrypted token; and
   providing the demand-side platform the stored user-specific preference information associated with the user.

12. A computer-implemented method for enabling identity escrow and preventing user-based data leakage and cookie-mapping, the method comprising:
   initiating delivery of content to a computing system of a user in response to a request for the content by the computing system of the user;
   storing a first deterministic identifier associated with the user;

storing user-specific preference information associated with the user based on the first deterministic identifier associated with the user;
receiving, from a publisher, a second deterministic identifier, wherein the publisher does not have access to the first deterministic identifier or the user-specific preference information;
determining if the second deterministic identifier is associated with the user associated with the first deterministic identifier;
retrieving the stored user-specific preference information associated with the user based on a determination that the second deterministic identifier and the first deterministic identifier are both associated with the user;
generating an encrypted token based on the retrieved user-specific preference information associated with the user, wherein the generated encrypted token does not comprise any personally identifiable information for the user;
determining a level of permission associated with one or more of a plurality of demand side platforms to possess a subset of the personally identifiable information for the user, wherein the subset of the personally identifiable information comprises data owned by the one or more of the plurality of demand side platforms or data enabled to be shared to one or more demand side platforms;
if at least one of the plurality of demand side platforms is determined to be associated with a level of permission to possess the subset of the personally identifiable information:
retrieving the subset of the personally identifiable information for the user based at least in part on the determined level of permission associated with the at least one of the plurality of demand side platforms;
encrypting the subset of the personally identifiable information for the user; and
adding the encrypted subset of the personally identifiable information to the encrypted token;
transmitting the encrypted token to the publisher for submission alongside a bid request to a demand-side platform for real-time bidding,
wherein the encrypted subset of the personally identifiable information of the encrypted token is configured to be inaccessible to any of the plurality of demand side platforms which has not be been determined to possess or be authorized to possess the subset of the personally identifiable information; and
delivering to the computing system of the user the content and an ad impression.

13. The method of claim 12, wherein the real-time bidding is processed outside of a header of a browser of the computing system of the user.

14. The method of claim 12, wherein the user-specific preference information comprises market segment membership information associated with the user.

15. The method of claim 12, wherein the user-specific preference information comprises purchasing preferences associated with the user.

16. The method of claim 12, wherein the first deterministic identifier is an email address for the user.

17. The computing system of claim 12, wherein the second deterministic identifier received from the publisher is associated with an impression opportunity offered by the publisher.

18. Non-transitory computer readable storage media storing instructions that, when executed by one or more processors, cause the one or more processors to enable identity escrow and prevent user-based data leakage and cookie-mapping by performing the steps of:
initiating delivery of content to a computing system of a user in response to a request for the content by the computing system of the user;
storing a first deterministic identifier associated with the user;
storing user-specific preference information associated with the user based on the first deterministic identifier associated with the user;
receiving, from a publisher, a second deterministic identifier, wherein the publisher does not have access to the first deterministic identifier or the user-specific preference information;
determining if the second deterministic identifier is associated with the user associated with the first deterministic identifier;
retrieving the stored user-specific preference information associated with the user based on a determination that the second deterministic identifier and the first deterministic identifier are both associated with the user;
generating an encrypted token based on the retrieved user-specific preference information associated with the user, wherein the generated encrypted token does not comprise any personally identifiable information for the user;
determining a level of permission associated with one or more of a plurality of demand side platforms to possess a subset of the personally identifiable information for the user;
if at least one of the plurality of demand side platforms is determined to be associated with a level of permission to possess the subset of the personally identifiable information:
retrieving the subset of the personally identifiable information for the user based at least in part on the determined level of permission associated with the at least one of the plurality of demand side platforms;
encrypting the subset of the personally identifiable information for the user; and
adding the encrypted subset of the personally identifiable information to the encrypted token;
transmitting the encrypted token to the publisher for submission alongside a bid request to a demand-side platform for real-time bidding,
wherein the encrypted subset of the personally identifiable information of the encrypted token is configured to be inaccessible to any of the plurality of demand side platforms which has not be been determined to possess or be authorized to possess the subset of the personally identifiable information; and
delivering to the computing system of the user the content and an ad impression.

19. The non-transitory computer readable storage media of claim 18, wherein the real-time bidding is processed outside of a header of a browser of the computing system of the user.

20. The non-transitory computer readable storage media of claim 18, wherein the user-specific preference information comprises market segment membership information associated with the user.

* * * * *